United States Patent
Cho

(10) Patent No.: US 7,141,134 B2
(45) Date of Patent: Nov. 28, 2006

(54) METHOD AND APPARATUS FOR AUTOMATICALLY TRANSFERRING PATTERN TO SURFACE OF STEERING WHEEL

(76) Inventor: Youn-Soo Cho, 206-1 Donam-dong, Youngsheon-city, Kyungsangbuk-do (KR) 770-130

( * ) Notice: Subject to any disclaimer, the term of this patent is extended or adjusted under 35 U.S.C. 154(b) by 93 days.

(21) Appl. No.: 10/514,938

(22) PCT Filed: Jan. 28, 2003

(86) PCT No.: PCT/KR03/00196

§ 371 (c)(1),
(2), (4) Date: Nov. 18, 2004

(87) PCT Pub. No.: WO03/099573

PCT Pub. Date: Dec. 4, 2003

(65) Prior Publication Data

US 2005/0224163 A1    Oct. 13, 2005

(30) Foreign Application Priority Data

May 29, 2002    (KR)    ............... 10-2002-0029830

(51) Int. Cl.
| | |
|---|---|
| B05D 1/20 | (2006.01) |
| B44C 1/165 | (2006.01) |
| B05C 3/02 | (2006.01) |
| B05C 11/08 | (2006.01) |
| B05D 1/38 | (2006.01) |
| B05D 3/00 | (2006.01) |
| B32B 37/10 | (2006.01) |
| B32B 37/06 | (2006.01) |

(52) U.S. Cl. ............ 156/235; 156/230; 156/240; 156/245; 156/277; 118/402; 118/429; 427/430.1; 427/434.3

(58) Field of Classification Search ............ 118/400, 118/402, 500, 58; 156/230, 235, 356, 394.1, 156/499, 538, 579; 427/560, 600, 430.1, 427/434.3

See application file for complete search history.

(56) References Cited

U.S. PATENT DOCUMENTS

| | | | | |
|---|---|---|---|---|
| 6,022,438 | A | * | 2/2000 | Watanabe et al. ............ 156/230 |
| 6,214,154 | B1 | | 4/2001 | Cho |
| 6,461,466 | B1 | | 10/2002 | Cho |
| 6,541,074 | B1 | * | 4/2003 | Cho ........................ 427/430.1 |
| 6,719,866 | B1 | | 4/2004 | Cho |
| 6,723,197 | B1 | | 4/2004 | Cho |

FOREIGN PATENT DOCUMENTS

| | | |
|---|---|---|
| EP | 1 088 676 | 4/2001 |
| JP | 3-63199 | 3/1991 |
| JP | 9-277794 | 10/1997 |
| KR | 2000-083840 | 11/2002 |

\* cited by examiner

*Primary Examiner*—Melvin Mayes
*Assistant Examiner*—Sonya Mazumdar
(74) *Attorney, Agent, or Firm*—Leydig, Voit & Mayer, Ltd.

(57) ABSTRACT

A method and apparatus for automatically transferring a pattern to a surface of a steering wheel, automating a series of hydraulic pressure transfer steps, such as steering wheel supply, hydraulic pressure transfer, drying, and cleaning. Since a series of hydraulic pressure transfer processes, such as steering wheel supply, first transfer to the front surface portion of a rim of a steering wheel, removing of foreign material, drying, second transfer to the rear surface portion of a rim of a steering wheel, first cleaning, and second cleaning, are automated, processing time is saved and labor costs are reduced, improving productivity.

37 Claims, 40 Drawing Sheets

METHOD AND APPARATUS FOR AUTOMATICALLY TRANSFERRING PATTERN TO SURFACE OF STEERING WHEEL

BACKGROUND OF THE INVENTION

1. Field of the Invention

The present invention relates to a method and apparatus for automatically transferring a pattern to a surface of a steering wheel, and more particularly, to a method and apparatus for automatically transcribing a pattern to a surface of a steering wheel by floating a transfer film on which a pattern print layer is formed on liquid and pressing the steering wheel onto the transfer film so that the pattern print layer is transferred to a surface of a rim portion of the steering wheel. In particular, a series of processes such as supplying, flipping, transferring, drying, and cleaning of a steering wheel are automatically performed.

2. Description of the Related Art

In general, to make products luxurious, a steering wheel and interior members of a car are used by being printed with a pattern such as wood pattern. Also, for the purpose of a luxurious product, a careful process is required to prevent defects such as bubbles generated between a transfer sheet and a product.

Further, an automated process is required to improve productivity such as accuracy of transfer and reduction of transfer time.

U.S. Pat. No. 6,022,438 discloses a method for transferring a transfer sheet on a surface of a steering wheel using hydraulic pressure. According to the method, transfer sheets are continuously provided and a steering wheel is moved by a conveyer so that transfer using hydraulic pressure is automatically performed. However, the disclosed technology is disadvantageous in that a pattern extends due to one time hydraulic pressure transfer which deteriorates the quality of steering wheel.

SUMMARY OF THE INVENTION

To solve the above and other problems, the present invention provides a method and apparatus for automatically transferring a pattern to a surface of a steering wheel in which a series of processes such as supplying, transferring, drying, and cleaning of a steering wheel are automatically performed.

Also, the present invention provides a method and apparatus for automatically transferring a pattern to a surface of a steering wheel by which accurate transfer is possible and steering wheels are transferred with the identical and high quality.

Also, the present invention provides a method and apparatus for automatically transferring a pattern to a surface of a steering wheel by which the first transfer and the second transfer are automatically performed onto a rim portion of the steering wheel.

According to one aspect of the present invention, there is provided a method for automatically transferring a pattern to a surface of a steering wheel, the method comprising the steps of supplying a steering wheel such that a boss is disposed upside and a rim portion is disposed downside, supplying a first transfer sheet having a printed layer on which a pattern is printed, by floating the first transfer sheet on liquid, injecting activating liquid to activate the printed layer onto an upper surface of the first transfer sheet, transferring the first transfer sheet to a surface of one half of a rim portion by pressing the rim portion against the upper surface of the first transfer sheet while a first robot holds the boss of the steering wheel, removing foreign materials such as water and transfer sheets remaining around the rim portion after the first transfer is performed, drying the steering wheel where the foreign materials are removed by passing through a drying tank in which hot wind is supplied, first flipping the steering wheel such that the rim portion of the steering wheel is disposed upside and the boss is disposed downside, supplying a second transfer sheet having a printed layer on which a pattern is printed, by floating the second transfer sheet on the liquid, transferring the second transfer sheet to a surface of the other half of a rim portion by pressing the rim portion against the upper surface of the second transfer sheet while the flipped steering wheel is held, after the second transfer step, first cleaning the steering wheel in a supersonic wave cleaning tank, and after the first cleaning step, second cleaning the steering wheel using cleaning water.

In the steering wheel supply step, the steering wheel can be supplied such that the rim portion is disposed upside and the boss is disposed downside. In this case, the first transfer sheet is first transferred to the lower surface of the rim portion, and the reverse process is performed in the first and second flipping steps In the foreign material removing step, foreign materials are removed by using air hoses which suck the foreign materials around the rim portion of a steering wheel by rotating the steering wheel.

The above method further comprises a second flipping step, after the second transfer step, in which the steering wheel is flipped such that the boss is disposed upside and the rim portion is disposed downside.

According to another aspect of the present invention, an apparatus for automatically transferring a transfer sheet to a surface of a rim portion of a steering wheel having a boss coupled to a steering shaft and the rim portion connected to the boss by a plurality of spokes, the apparatus comprising a steering wheel supply unit supplying a steering wheel such that the boss is disposed upside and the rim portion is disposed downside, a first transfer sheet supply unit supplying a first transfer sheet having a printed layer on which a pattern is printed, by floating the first transfer sheet on liquid, a first robot unit holding the boss of the steering wheel and pressing the rim portion against an upper surface of the first transfer sheet to transfer the first transfer sheet to a surface of half of the rim portion, a foreign material removing unit removing foreign materials such as water and transfer sheets remaining around the rim portion by moving the steering wheel where the first transfer sheet is transferred by the first robot unit, a drying unit drying the steering wheel where the foreign materials by supplying hot wind, a first flipping unit flipping the steering wheel such that the rim portion of the dried steering wheel is disposed upside and the boss is disposed downside, a second transfer sheet supply unit supplying a second transfer sheet having a printed layer on which a pattern is printed, by floating the second transfer sheet on liquid, a second robot unit holding the flipped steering wheel and pressing the rim portion against an upper surface of the second transfer sheet to transfer the second transfer sheet to a surface of the other half of the steering wheel, a first cleaning unit first cleaning the steering wheel where the second transfer sheet is transferred, and a second cleaning unit cleaning the steering wheel first cleaned using cleaning water.

The steering wheel supply unit comprises a pair of first chain belts separated a predetermined distance from each other and circulating together, a first driving motor driving the first chain belt, and a first carrier block, where the steering wheel is accommodated, fixed between the first chain belts and moving together with the first chain belts.

The above apparatus further comprises a first sensor member detecting the steering wheel moved by being accommodated on the first carrier block, and a stop portion stopping the first carrier block according to a detection signal of the first sensor member.

The first carrier block comprises a lower plate fixed between the first chain belts, a guide shaft fixedly coupled to the lower plate, an upper plate where a sleeve is formed at a bottom surface of the upper plate so that the guide shaft is coupled to the sleeve to be capable of sliding, a sprig coupled to the guide shaft to elastically moving the upper plate with respect to the lower plate, and a first post fixed to the upper surface of the upper plate and having a first head block to which the boss of the steering wheel is coupled and accommodated.

The stop portion comprises a stopper extending downward from a side surface of the first carrier block, and a stopper cylinder provided between the first chain belts and having a sliding rod sliding in and out to be interfered with the stopper.

The above apparatus further comprises a first elevating cylinder accommodating and ascending the steering wheel from the first head block at a stop position of the first carrier block.

The first transfer sheet supply unit comprises a first tank containing liquid, a pair of second chain belts separated a predetermined distance and circulating together in the first tank, a second driving motor driving the second chain belts, and a plurality of first connection rods, provided at a predetermined interval, having both ends fixed to the second chain belts and proceeding on a surface of the liquid, wherein the first transfer sheet is moved together with the first connection rods between the neighboring first connection rods on the surface of the liquid.

A first discharge hole through which the liquid exceeding a particular surface level is discharged to maintain a constant surface level of the liquid in the first tank.

The first robot unit comprises, a main arm pivoting with respect to a base, a first arm coupled to the main arm by a hinge and pivoting up and down, a second arm connected to the first arm and pivoting, and a third arm connected to the second arm and pivoting, and having a chuck member holding the boss of the steering wheel at an end portion of the third arm.

The above apparatus further comprises an injection nozzle, provided at the end portion of the third arm, injecting an activating liquid onto a surface of the first transfer sheet.

The foreign material removing unit comprises a second carrier block having a second post where the steering wheel to which the first transfer sheet is transferred is accommodated, a rotation portion rotating the steering wheel where the second carrier block is accommodated, and an air hose sucking foreign materials remaining on the steering wheel close to the rotating steering wheel.

The rotation portion comprises a first main cylinder having a first cylinder rod having a first coupling chuck coupled to the boss of the steering wheel formed at an end portion of the first cylinder rod, and rotating the steering wheel, a first elevating gear coaxially coupled to the first cylinder rod and moving up and down together with the first cylinder rod, and a third driving motor having a first motor gear engaged with the first elevating gear and rotating together with the first elevating gear.

The first flipping unit comprises first and second holding cylinders having a pair of grips holding opposite ends of the steering wheel, a frame supporting the first and second holding cylinders to be capable of rotating, a rotation cylinder supported by the frame and rotating the first and second holding cylinders, a second elevating cylinder elevating the frame, and a horizontal moving cylinder horizontally moving the second elevating cylinder and the frame.

The above apparatus further comprises an arm member having both ends supported by the frame to be capable of rotating together with the first and second cylinders.

A stopper restricting a degree of rotation of the arm member is further provided at the frame.

A moving unit on which the flipped steering wheel is accommodated and moved is provided between the first flipping unit and the second transfer sheet supply unit.

The moving unit comprises a plurality of third carrier blocks each having a third head block to which the boss of the flipped steering wheel is coupled, and a fourth chain belt to which the third carrier blocks are fixed at a predetermined interval, and circulating along an endless path.

The second transfer sheet supply unit comprises a second tank containing liquid, a pair of fifth chain belts separated a predetermined distance and circulating together in the second tank, a fifth driving motor driving the fifth chain belts, and a plurality of second connection rods, provided at a predetermined interval, having both ends fixed to the fifth chain belts and proceeding on a surface of the liquid, wherein the second transfer sheet is moved together with the second connection rods between the neighboring second connection rods on the surface of the liquid.

A second discharge hole through which the liquid exceeding a particular surface level is discharged to maintain a constant surface level of the liquid in the second tank.

The second robot unit is made of multi-joints to be capable of moving and inclining up and down, and left and right, by holding the steering wheel at an end portion of the second robot unit, and comprises a fixed bar fixed to the last joint of the multi-joints, first and second holding levers rotatably supported by both ends of the fixed bar and holding the steering wheel, and first and second operating cylinders rotating the first and second holding levers.

The second robot unit further comprises an injection nozzle injecting activating liquid onto the surface of the second transfer sheet.

The first cleaning unit comprises a third tank containing liquid, a sixth chain belt circulating along an endless path in the third tank, a plurality of fourth carrier blocks supporting the steering wheel and moving together by being connected to the sixth chain belt at a predetermined interval, and a supersonic oscillator accommodated in the third tank and generating a supersonic wave.

The above apparatus further comprises a moving unit moving the fourth carrier block passing through the first cleaning unit to the second cleaning unit.

The second cleaning unit comprises a seventh chain belt driven parallel to the sixth chain belt, a plurality of first and second block cases fixed to the sixth and seventh chain belts at a predetermined interval and where the fourth carrier blocks are detachably accommodated, a first guide plate provided between the sixth and seventh chain belts and guiding the fourth carrier blocks to be capable of sliding, and a first pusher portion taking the fourth carrier block from the first block case and coupling the fourth carrier block to the second block case via the first guide plate.

The pusher portion comprises a pair of first guide shafts parallel to the first guide plate, a first linear motor moving along one of the first guide shafts, a first guide block coupled to the other one of the first guide shafts and moving together with the first linear motor, a first pusher connected to the first guide block and pushing the fourth carrier block to be moved together, and a first sensor block having a first sensor rod detecting the fourth carrier block moving along the sixth chain belt at a position corresponding to the first guide plate, and driving the first linear motor by transmitting a detection signal to the first linear motor.

The second cleaning unit comprises a fourth carrier block where the first cleaned steering wheel is accommodated, a seventh chain belt moving the fourth carrier block, an injection pipe injecting cleaning water onto a surface of the steering wheel, and a wheel rotating unit rotating the steering wheel.

The wheel rotating unit comprises a second main cylinder having a second cylinder rod where a second coupling chuck coupled to the boss of the steering wheel is formed at an end of the second cylinder rod, and rotating the steering wheel, a second elevating gear coaxially coupled to the second cylinder rod and moving up and down together with the second cylinder rod, and a fourth driving motor having a second motor gear engaged with the second elevating gear and rotating together with the second elevating gear.

The above apparatus further comprises a carrier block circulation unit moving the fourth carrier block passing the second cleaning unit from the second block case of the seventh chain belt to the first block case.

The carrier block circulation unit comprises a second guide plate provided between the sixth and seventh chain belts and guiding the fourth carrier block to be capable of sliding, and a second pusher unit taking the fourth carrier block out of the second block case and coupling the fourth carrier block to the first block case via the second guide plate.

The second pusher unit comprises a pair of second guide shafts parallel to the second guide plate, a second linear motor moving along one of the second guide shafts, a second guide block coupled to the other second guide shaft and moving together with the second linear motor, a second pusher connected to the second guide block and pushing the fourth carrier block and moving together with the fourth carrier block, and a second sensor block having a second sensor rod detecting the fourth carrier block moving along the seventh chain belt at a position corresponding to the second guide plate, and driving the second linear motor by transmitting the detected signal to the second linear motor.

The above apparatus further comprises a second flipping unit flipping the steering wheel such that the rim portion of the steering wheel to which the second transfer sheet is transferred is disposed downside and the boss of the steering wheel is disposed upside.

The second flipping unit comprises third and fourth holding cylinders having a pair of grips holding opposite sides of the steering wheel, a frame supporting the third and fourth holding cylinders to be capable of rotating, a rotation cylinder supported by the frame and rotating the third and fourth holding cylinders, a third elevating cylinder elevating the frame, and a fixed support frame where the third elevating cylinder is fixedly supported.

A guide rail formed to be lengthy in a vertical direction is fixed to the fixed support frame, and a guide block coupled to the guide rail to be capable of sliding is coupled to the rotation cylinder.

An arm member rotating together with the third and fourth holding cylinders is provided at the frame so that, when the steering wheel is flipped, the arm member is rotated together.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
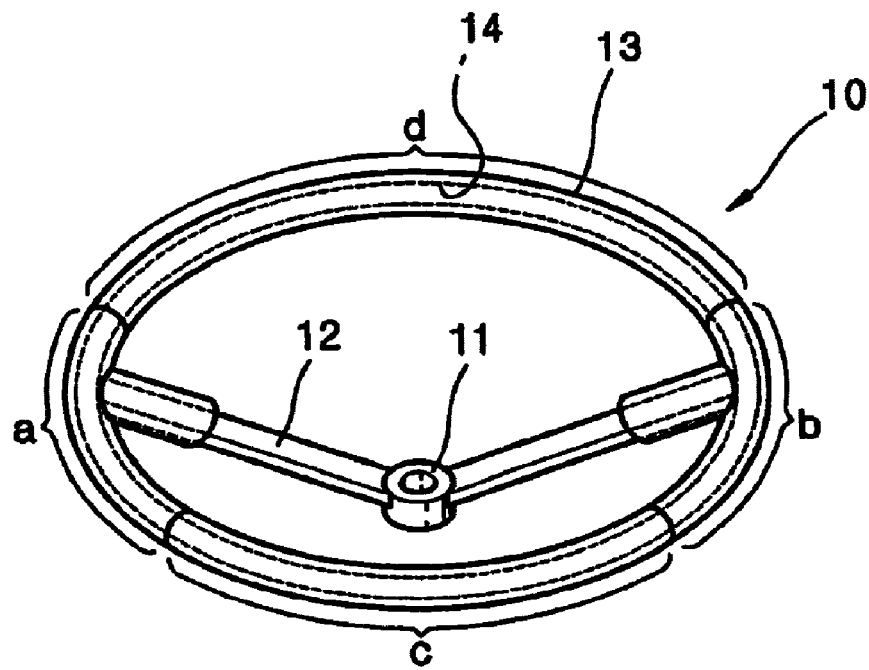
FIG. 1 is a perspective view illustrating a steering wheel.
Figure 2:
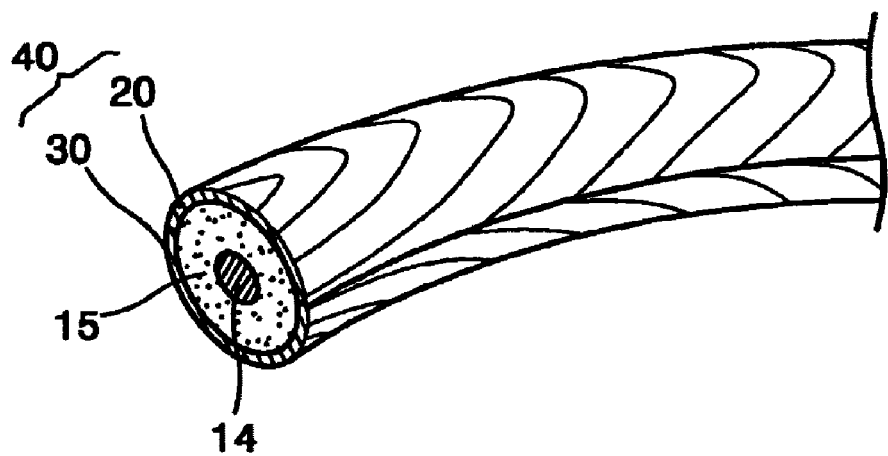
FIG. 2 is a partially cutaway perspective view illustrating a state in which a transfer sheet is transferred to a surface of a rim portion of a steering wheel.

Referring to FIGS. 1 and 2, a steering wheel of a car adopted in the present invention includes a boss 11 coupled to a steering shaft (not shown) and a rim portion 13 connected to the boss 11 by a plurality of spokes 12. The rim portion 13 is formed by providing PVC or urethane molding around a circular core member 14. Typically, connection portions a and b between the spokes 12 and the rim portion 13 are enclosed by leather or other members. Since the leather portion provides a sensation of luxury, no other surface transfer with a luxurious pattern is needed. Thus, in the automatic transfer method and apparatus according to the present invention, surface transfer is performed with respect to remaining rim portions c and d other than the connection portions a and b. Prior to performing transfer, the connection portions a and b are protected by being wrapped by vinyl or other members.

Figure 3:
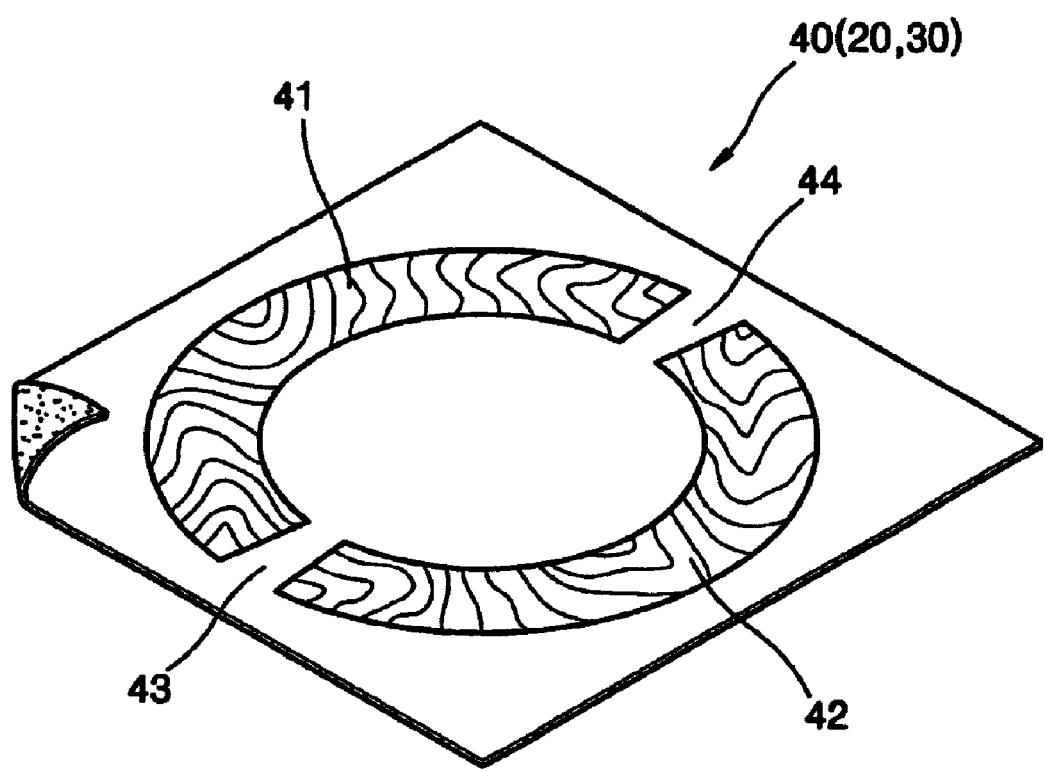
FIG. 3 is a perspective view illustrating a transfer sheet.

Also, in the present invention, transfer is performed by two times to the surface of the rim portion 13. As shown in FIG. 2, a first transfer sheet 20 is transferred to the upper surface of the rim portion 13 and a second transfer sheet 30 is transferred to the lower surface of the rim portion 13. A transfer sheet 40, that is, the first and second transfer sheets 20 and 30, have the same pattern, as shown in FIG. 3. The transfer sheet 40 has print layers 43 and 44 having no pattern corresponding to the connection portions a and b and pattern printed layers 41 and 42 corresponding to the remaining rim portions c and d.

A method for automatically transferring the first and second transfer sheets 20 and 30 to a surface of the steering wheel 10 is described below in detail.

Figure 5:
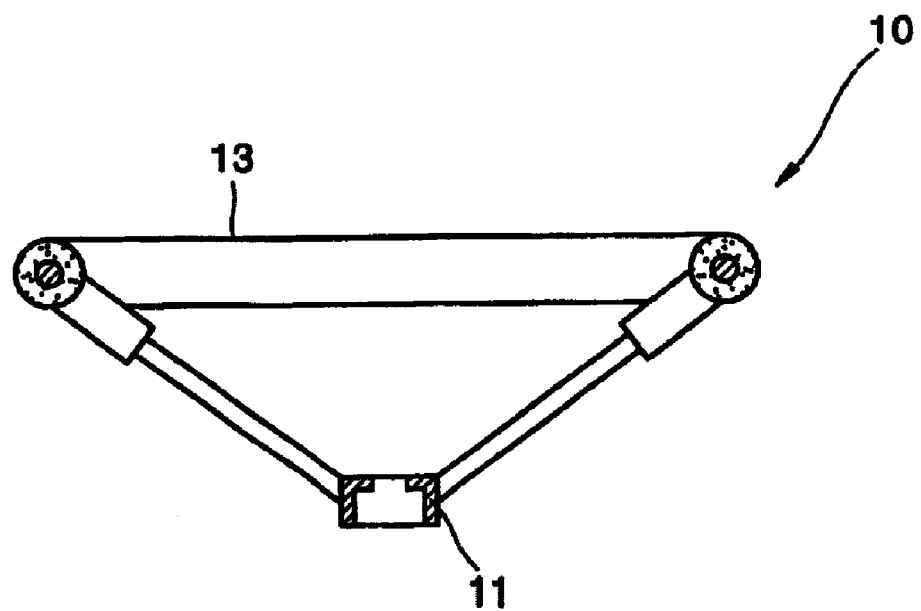
FIG. 5 is a sectional view illustrating the steering wheel shown in FIG. 4 which is flipped.
Figure 6:
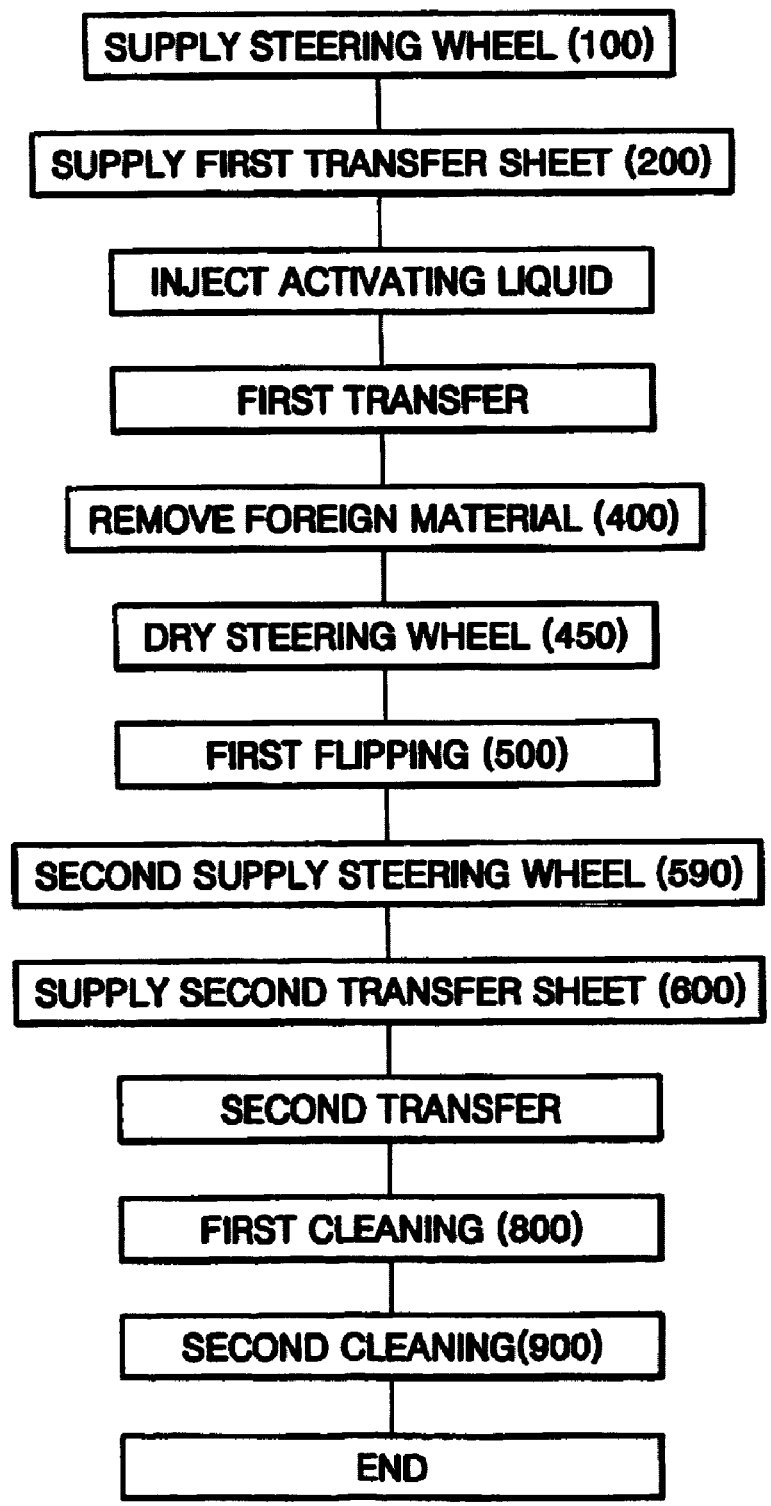
FIG. 6 is a flow chart for explaining an automatic transfer method according to the present invention.
Figure 7:
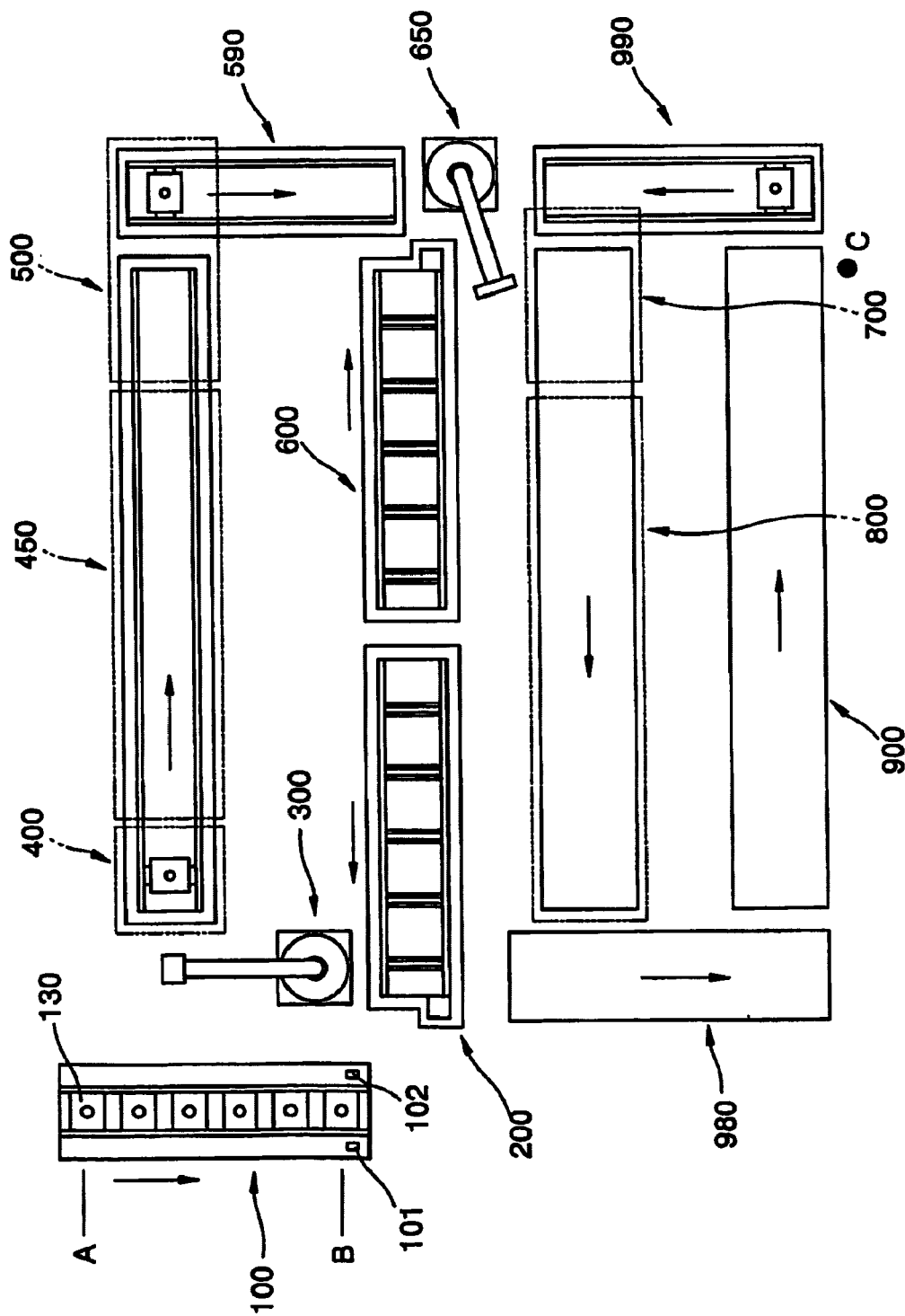
FIG. 7 is a schematic view illustrating an automatic transfer apparatus according to the present invention.
Figure 8:
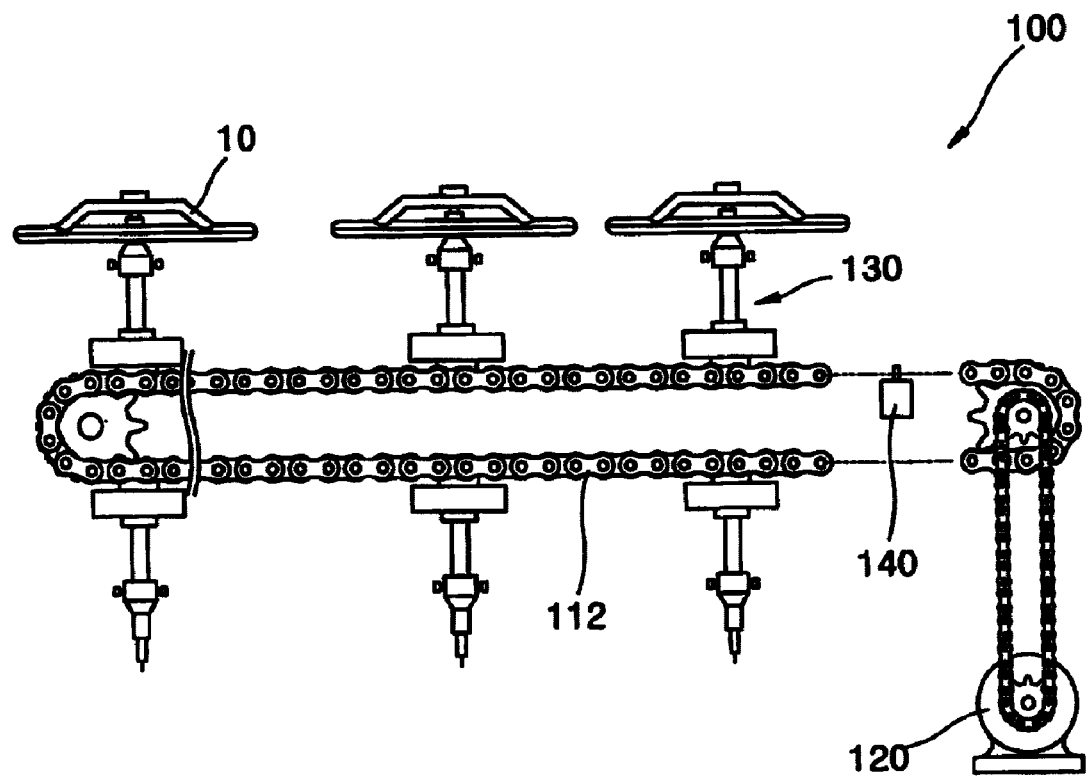
FIG. 8 is a side view illustrating a steering wheel supply unit.

Referring to FIGS. 6 and 7, an automatic transferring method according to the present invention includes a steering wheel supply step 100 in which the steering wheel 10 is supplied in a manner that the boss 11 is disposed upside and the rim portion 13 is disposed downside, a first transfer sheet supply step 200 in which the first transfer sheet 20 having a print layer where a pattern is printed is supplied to float on liquid, an activating liquid injection step in which activating liquid for activating the print layer is injected onto the upper surface of the supplied first transfer sheet 20, a first transfer step in which a first robot 300 holds the boss 11 of the steering wheel 10 and presses the upper surface of the rim portion 13 against the upper surface of the first transfer sheet 20 to transfer the first transfer sheet 20 to the surface of the half of the rim portion 13, a foreign material removing step 400 in which water and the transfer sheet remaining around the rim portion 13 after the first transfer step, a drying step 450, in which the steering wheel 10 removed of foreign materials is supplied to and dried by a chamber 452 (refer to FIG. 18) where hot wind is supplied, a first flipping step 500 in which the steering wheel 10 is flipped such that the rim portion. 13 of the steering wheel 10 is disposed upside and the boss 11 is disposed downside, as shown in FIG. 5, a steering wheel supply step 590 in which the flipped steering wheel 10 is moved to a second transfer step which is described later, a second transfer sheet supply step 600 in which the second transfer sheet 30 having a pattern printed print layer is supplied to float on liquid, an activating liquid injection step in which activating liquid is injected to the supplied second transfer sheet, the second transfer step in which a second robot 650 holds the flipped steering wheel and presses the remaining half side of the rim portion 13 against the upper surface of the second transfer sheet 30 to transfer the second transfer sheet 30 to the surface of the remaining half of the rim portion 13, a first cleaning step 800 in which the steering wheel 10 is cleaned using an ultrasonic wave in an ultrasonic wave cleaning tank 860 (refer to FIG. 31) after the second transfer step, and a second cleaning step 900 in which the steering wheel 10 is cleaned using cleaning water after the first cleaning step 800, so that the transfer sheets are transferred to the surface of the rim portion 13 of the steering wheel.

In the steering wheel supply step 100, the steering wheel is supplied with the rim portion 13 disposed at the upper side so that transfer is first performed on the upper surface of the rim portion 13. The supplied steering wheel 10 is moved to a first transfer position by the first robot holding the boss 11. Since the upper surface of the rim portion 13 of the moved steering wheel 10 directs downward, when the rim portion 13 presses the first transfer sheet 20, the upper surface of the rim portion 13 is first transferred.

Figure 16A:
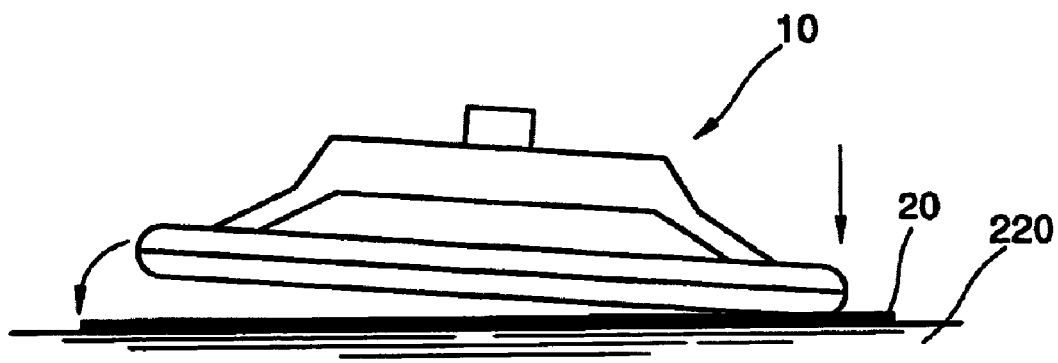
FIGS. 16A and 16B are views illustrating a state in which the first transfer sheet is transferred to a wheel.

Here, as shown in FIG. 16A, the steering wheel 10 is lowered to be inclined first by a predetermined angle and then become horizontal gradually with respect to the first transfer sheet 20. Accordingly, since the first transfer sheet gradually contacts the surface of the rim portion 13 of the steering wheel rim 10 by means of hydraulic pressure, defects such as generation of bubbles between the first transfer sheet 20 and the surface of the rim portion 13 can be minimized.

Figure 17:
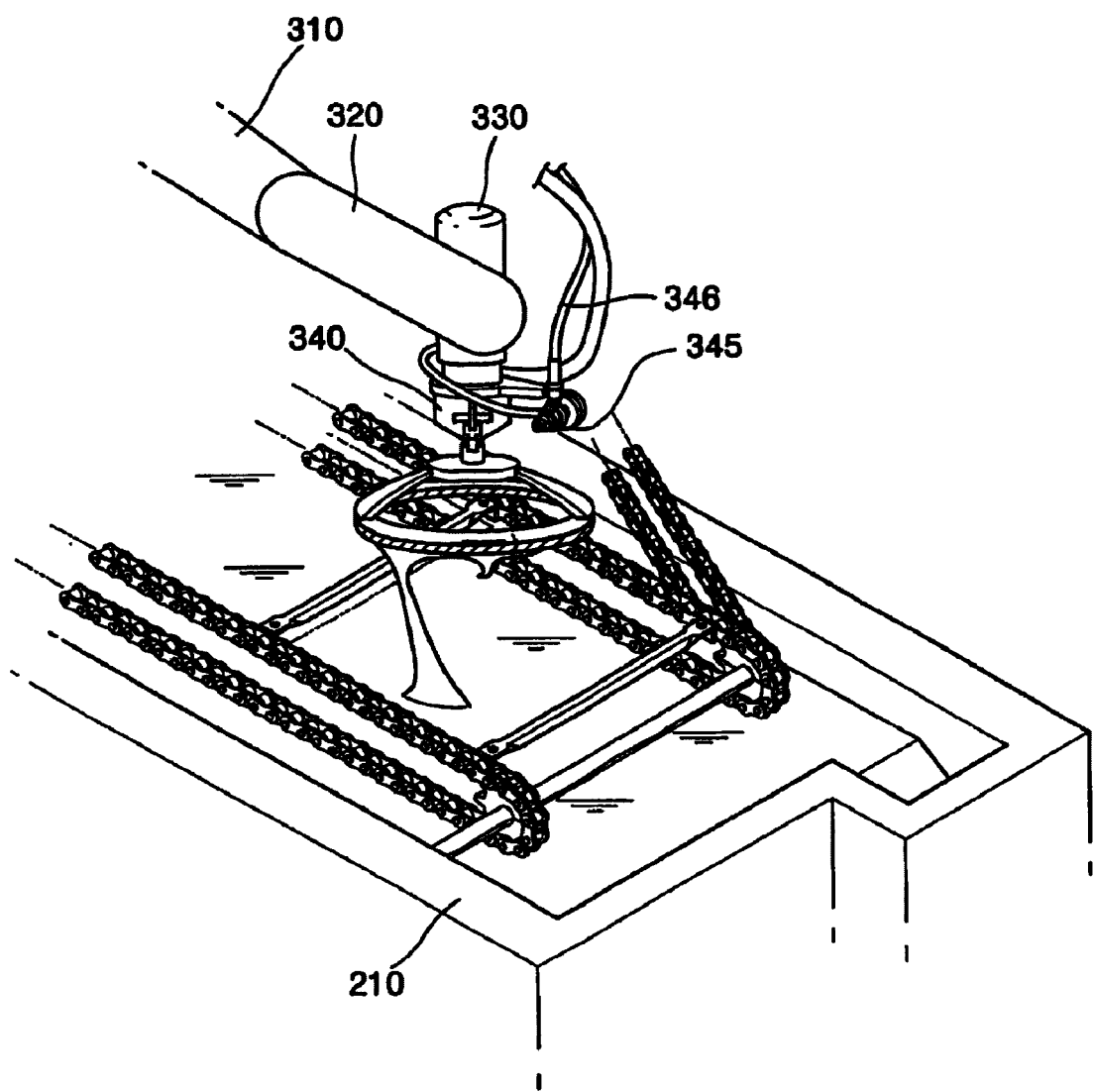
FIG. 17 is a perspective view illustrating a state in which a first robot lifts the wheel where the first transfer sheet is transferred.

After the first transfer step, as shown in FIG. 17, the transfer sheets which are not transferred to the steering wheel 10 remain. These remaining transfer sheets are removed in the foreign material removing step before the second transfer is performed.

In the foreign material removing step, while the steering wheel 10 is rotated, foreign materials are removed by being sucked by an air hose 431 and 432 (refer to FIG. 19) around the rim portion 13 of the steering wheel 10. The steering wheel 10 which is removed of foreign materials is dried in the drying tank before the second transfer sheet 30 is transferred.

In the first flipping step 500, as shown in FIG. 5, since the second robot holds the connection portions a and b of the rim portion 13 while the boss 11 directs downward, the other portion of the rim portion 13 where the first transfer sheet 20 is not transferred directs downward. Thus, when the second transfer sheet 30 is pressed by lowering the steering wheel 10, the second transfer sheet 30 is transferred to the other portion of the rim portion 13.

After the second transfer step, the second flipping step for flipping the steering wheel 10 is carried out such that the boss 11 is disposed upside and the rim portion 13 is disposed downside. In this case, since the rim portion 13 of the steering wheel 10 passing the ultrasonic wave cleaning tank is close to an ultrasonic wave oscillation portion 870 (refer to FIG. 31) installed at the bottom surface of the cleaning tank, an efficiency of cleaning can be improved.

The steering wheel 10 completing the ultrasonic wave cleaning is cleaned again with cleaning water in the second cleaning step. Here, the steering wheel 10 is rotated and cleaned by the cleaning water injected around the steering wheel 10.

An apparatus for automatically transferring a pattern to a surface of a steering wheel suitable for the above-described transfer method will now be described.

Figure 4:
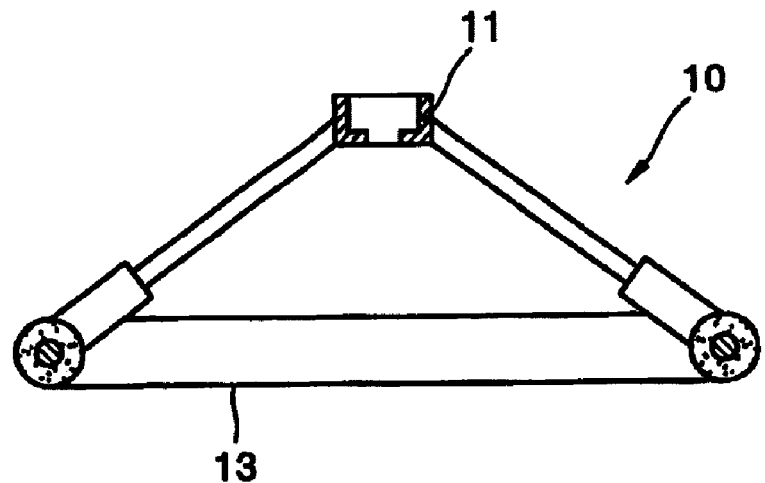
FIG. 4 is a sectional view illustrating a steering wheel.

Referring to FIG. 7, the present invention includes a steering wheel supply unit 100 for supplying the steering wheel 10 so that the boss 11 is disposed upside and the rim portion 13 is disposed downside, as shown in FIG. 4, a first transfer sheet supply unit 200 for supplying the first transfer sheet 20 having the pattern printed layers 41 and 42 where a pattern is printed, as shown in FIG. 3, by floating the first transfer sheet 20 on liquid, a first robot unit 300 for transferring the first transfer sheet 20 to the surface of the half of the rim portion 13 by holding the boss 11 of the steering wheel 10 and pressing the rim portion 13 against the upper surface of the first transfer sheet 20, a foreign material removing unit 400 for removing water and the transfer sheet remaining around the rim portion 13 by moving the steering wheel 10, on which the first transfer sheet 20 is transferred, by using the first robot unit 300, a drying unit 450 for drying the steering wheel 10 by blowing hot wind to the steering wheel 10 where foreign material is removed, a first flipping unit 500 for flipping the steering wheel 10 so that the rim portion 13 of the steering wheel 10 which is dried is disposed upside and the boss 11 is disposed downside, as shown in FIG. 5, a second transfer sheet supply unit 600 for supplying the second transfer sheet 30 having the pattern printed layers 41 and 42 where a pattern is printed by floating the second transfer sheet 30 on liquid, a second robot unit 650 for transferring the second transfer sheet 30 to the surface of the other half of the rim portion 13 by holding the steering wheel 10 which is flipped and pressing the rim portion 13 against the upper surface of the second transfer sheet 30, a first cleaning unit 800 for first cleaning the steering wheel 10 to which the second transfer sheet 30 is transferred, and a second cleaning unit 900 for cleaning the steering wheel 10 which is first cleaned by using cleaning water.

Steering Wheel (10) Supply Unit

Referring to FIG. 7 through 11, the steering wheel supply unit 100 includes a pair of first chain belts 111 and 112 circulating together by being separated a predetermined interval, a first driving motor 120 for driving the first chain belts 111 and 112, and a first carrier block 130 fixed between the first chain belts 111 and 112 and moving together with the first chain belts 111 and 112 and where the steering wheel 10 is accommodated. There are a plurality of the first carrier blocks 130 provided between the first chain belts 111 and 112 at a predetermined interval.

Also, the steering wheel supply unit 100 includes first sensor members 101 and 102 for detecting the steering wheel 10 which is carried by the first carrier block 130 and a stop means for stopping the first carrier block 130 according to a detection signal of the first sensor members 101 and 102.

Figure 9:
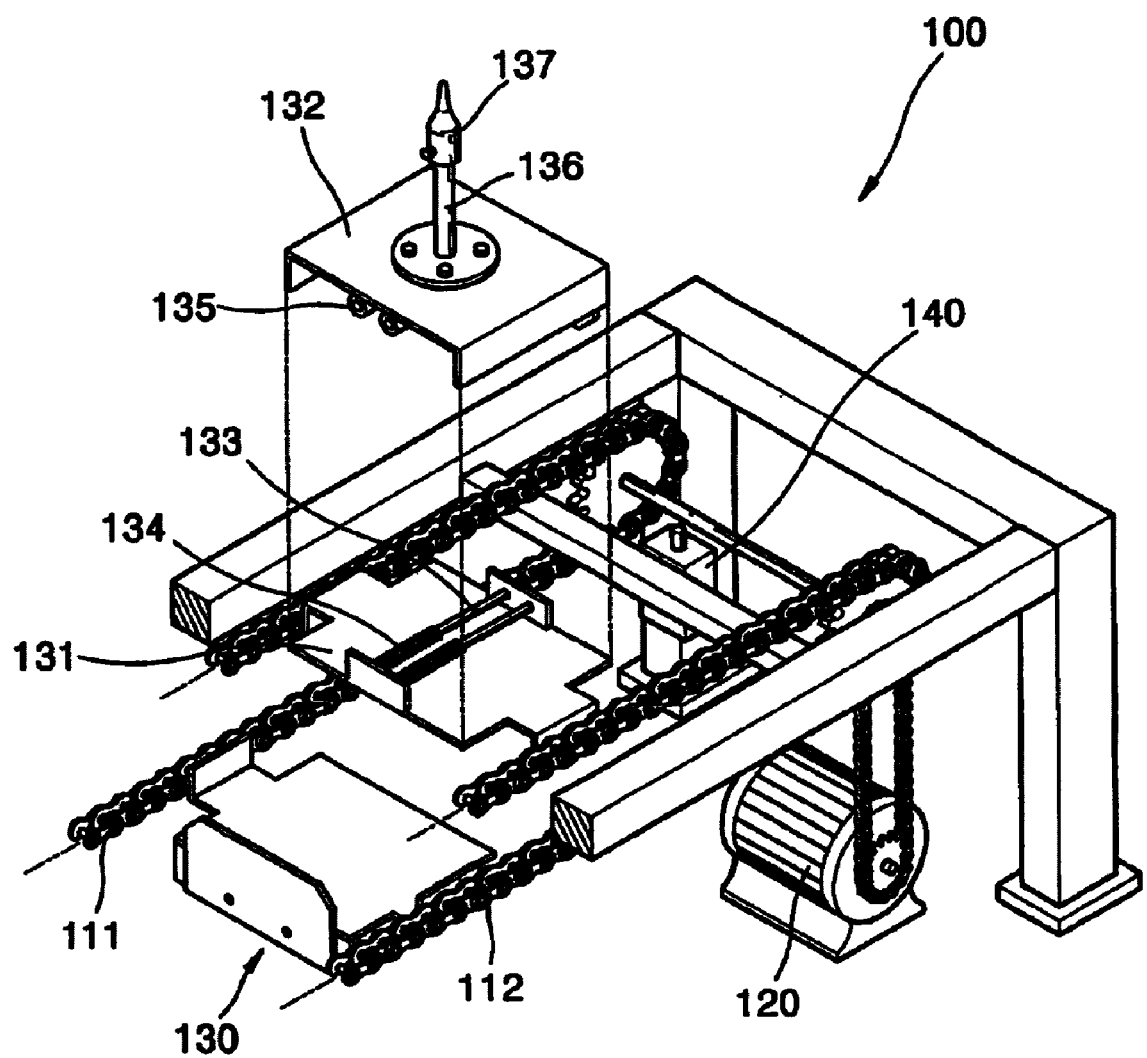
FIG. 9 is a perspective view illustrating an end portion of the steering wheel supply unit of FIG. 8.
Figure 10:
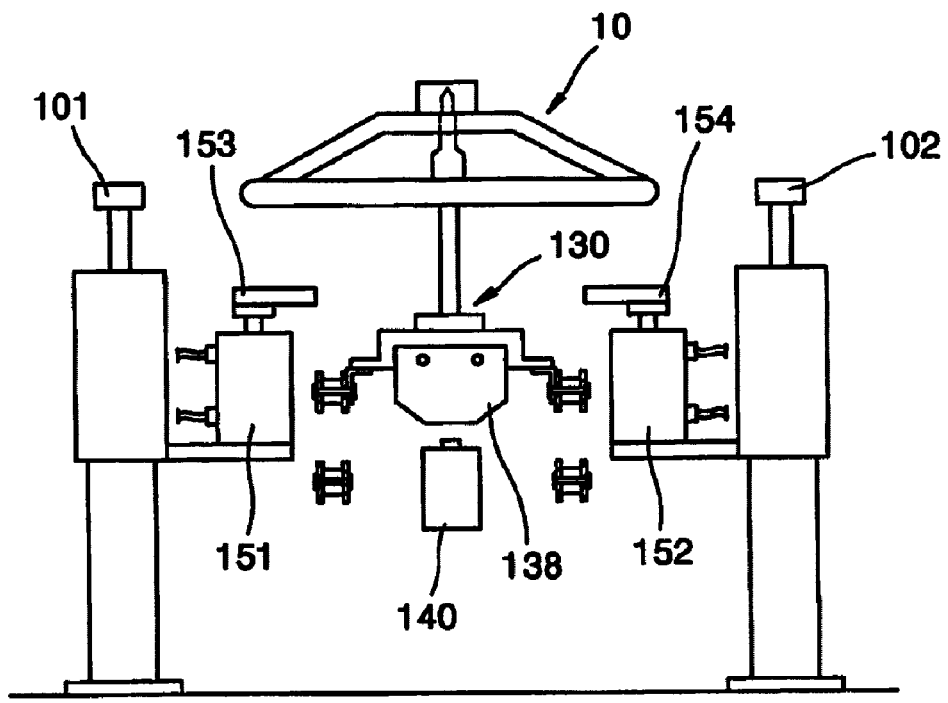
FIG. 10 is a front view illustrating major parts at the end portion of the steering wheel supply unit of FIG. 8.

The first carrier block 130, as shown in FIG. 9, includes a lower plate 131 fixed between the first chain belts 111 and 112, a guide shaft 133 fixedly coupled to the lower plate 131, an upper plate 132 having a sleeve 135 formed at the bottom surface thereof and coupled to the guide shaft 133 to be capable of sliding, a spring 134 coupled to the guide shaft 133 to elastically move the upper plate 132 with respect to the lower plate 131, and a first post 136 fixed to the upper surface of the upper plate 132 and having a first head block 137 which the boss 11 of the steering wheel 10 is coupled to and place on.

Figure 12:
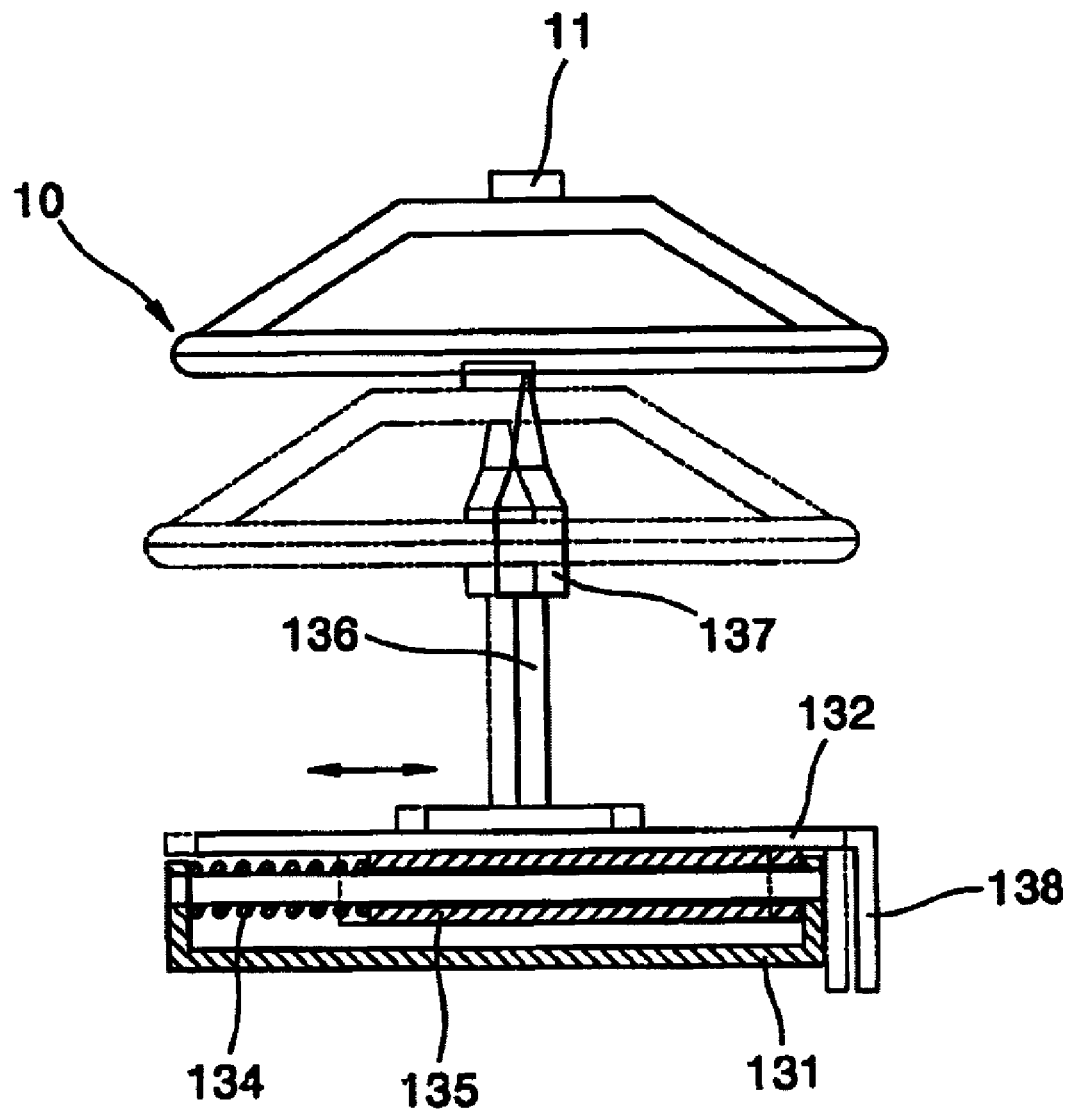
FIG. 12 is a sectional view illustrating a first transfer block.

The first carrier block 130 having the above structure, as shown in FIG. 12, when the boss 11 of the steering wheel 10 is coupled to the first head block 137, even if the centers of the boss 11 and the first head block 137 do not match, since the upper plate 132 can move along the guide shaft 133, compressing the spring 134, so that correction is possible.

The stop means includes a stopper 138 extending downward from the side surface of the upper plate 132 of the first carrier block 130 and a stopper cylinder 140 provided between the first chain belts 111 and 112 and having a sliding rod 141 sliding up and down and interfered with the stopper 138.

The stop means is operated such that, as the stopper cylinder 140 is operates according to a signal of the first sensor members 101 and 102 detecting the movement of the steering wheel 10 placed on the first carrier block 130 at a certain position, the stopper 138 is caught by the sliding rod 141 that protrudes so that the first carrier block 130 is stopped. Here, the first driving motor 120 is stopped according to the signal of the first sensor members 101 and 102.

First elevating cylinders 151 and 152 for ascending the steering wheel 10 from the first head block 137 is further provided a stop position of at the first carrier block 130. Accommodation units 153 and 154 where the rim portion 13 of the steering wheel 10 is accommodated are provided at end portions of cylinder rods of the first elevating cylinders 151 and 152. The accommodation units 153 and 154 raised by the first elevating cylinders 151 and 152 make the steering wheel 10 positioned horizontally.

The steering wheel supply unit 100 is operated as follows. First, the steering wheel 10 supplied to the steering wheel supply unit 100 is placed on the first carrier block 130 at an initial supply position A by a worker by wrapping the connection portions a and b (see FIG. 1) connecting the spoke 12 and the rim portion 13 with vinyl.

Here, when the boss 11 of the steering wheel 10 is coupled to the first head block 137 by the worker, even if the centers of the boss 11 and the first head block 137 do not match, since the upper plate 132 is moved to one side by compressing the spring 134, they can be smoothly coupled and accommodated.

Figure 11:
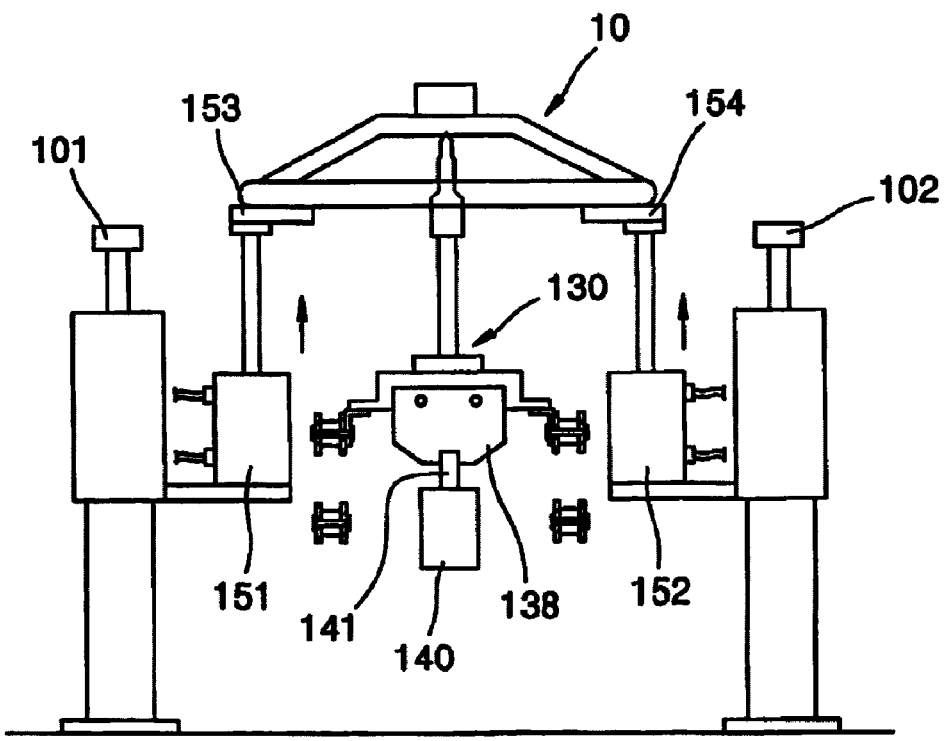
FIG. 11 is a front view illustrating a state in which the wheel of FIG. 10 is raised.

Here, the steering wheel 10 is driven by the first driving motor 120 to move to an escape position B from the initial supply position A. The steering wheel 10 moved to the escape position B is detected by the first sensor members 101 and 102. The detected signal stops the first driving motor 120 and simultaneously drives the stopper cylinder 140 to ascends the sliding rod 141. As the stopper 138 of the first carrier block 130 is caught by the sliding rod 141 that protrudes, the first carrier block 130 is stopped at an accurate position. At the same time, the first elevating cylinders 151 and 152 are operated to slightly lift the steering wheel 10, as shown in FIG. 11.

In the above lifted state, the steering wheel 10 is held by the first robot described later and moved to the first transfer unit 200. Here, since the steering wheel 10 is maintained in a horizontal state by the accommodation units 153 and 154, it can be accurately held by the first robot.

First Transfer Sheet Supply Unit 200

Figure 13:
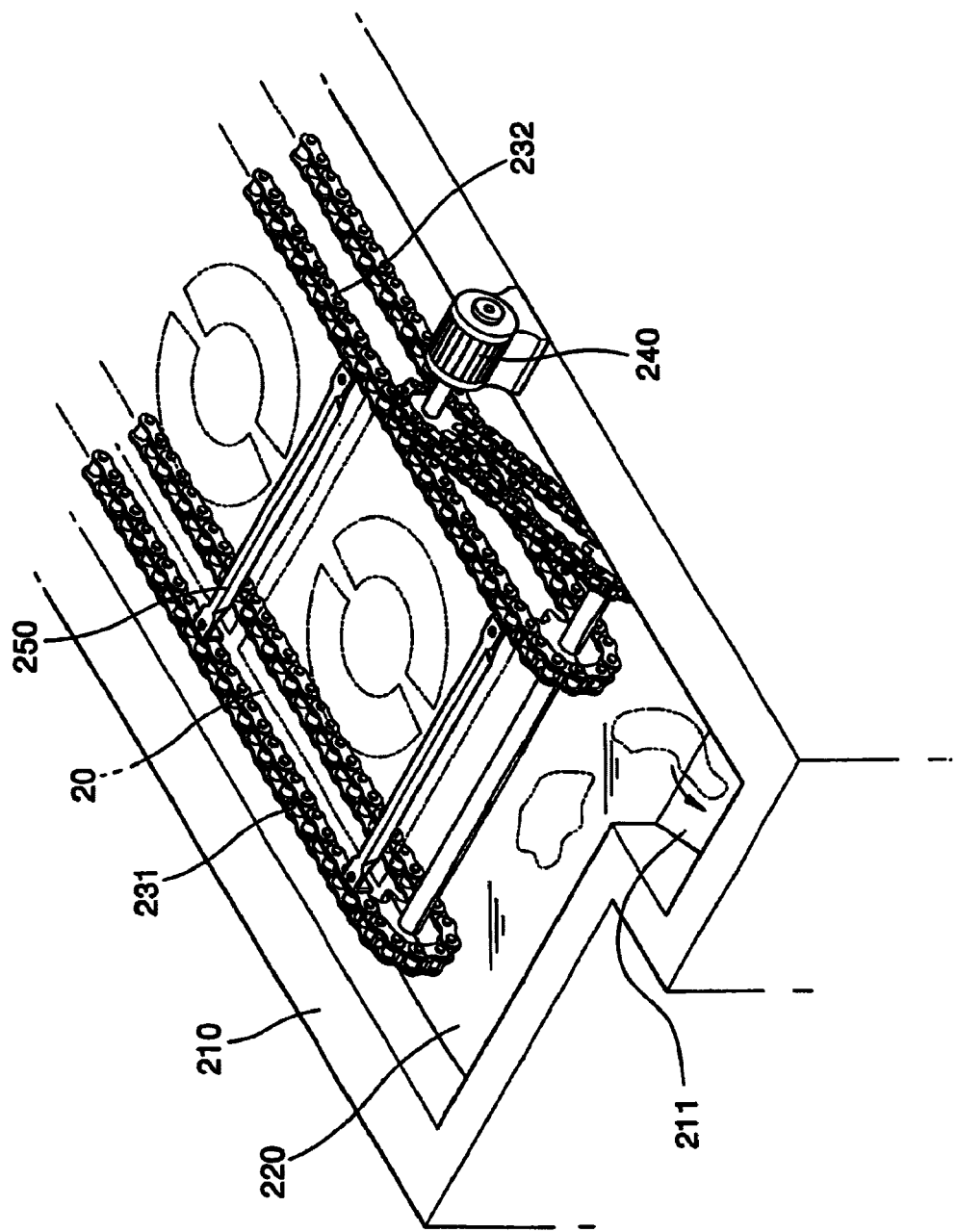
FIG. 13 is a perspective view illustrating major parts of a first transfer unit.

Referring to FIGS. 7 and 13, the first transfer sheet supply unit 200 is installed close to the steering wheel supply unit 100. The first transfer sheet supply unit 200 includes a first tank 210 containing liquid 220, a pair of second chain belts 231 and 232 circulating together in the first tank 210 by being separated a predetermined distance, a second driving motor 240 for driving the second chain belts 231 and 232, and a plurality of first connection rods 250, provided at a predetermined interval, having both ends fixed to the second chain belts 231 and 232 and proceeding on a surface of the liquid 220.

The first transfer sheet 20 is unfolded by the worker between the first connection rods 250 on the liquid surface. The first transfer sheet 20 is moved by the first connection rods 250 driven by the second driving motor 240 to a first transfer position in a state of floating on the liquid surface.

The first transfer sheet 20 maintains a halt state at the first transfer position for a predetermined period of time. Then, the first robot unit 300 injects activating liquid and performs a hydraulic transfer to part of the rim portion 13 by holding the steering wheel supplied by the steering wheel supply unit 100.

The first transfer sheet 20 remaining on the liquid surface after the hydraulic transfer is discharged through a first discharge hole 211 of the first tank 210. Also, the first discharge hole 211 maintains a constant surface level of the liquid in the first tank 210.

First Robot Unit 300 and First Transfer

The first robot 300 injects activating liquid onto the upper surface of the first transfer sheet 20 supplied to the first transfer sheet supply unit 200, holds the steering wheel 10 supplied from the steering wheel supply unit 100 and performs a first transfer by transferring the first transfer sheet 20 to the rim portion 13, and moves the steering wheel 10 to the foreign material removing unit 400.

Referring to FIGS. 14 through 17, the first robot unit 300 includes a main arm 301 pivoting with respect to a base (not shown), a first arm 310 coupled to the main arm 301 by a hinge and pivoting up and down, a second arm 320 pivoting by being coupled to the first arm 310, and a third arm 330 pivoting by being connected to the second arm 320 and having a chuck member 340 holding the boss 11 of the steering wheel 10.

Figure 14:
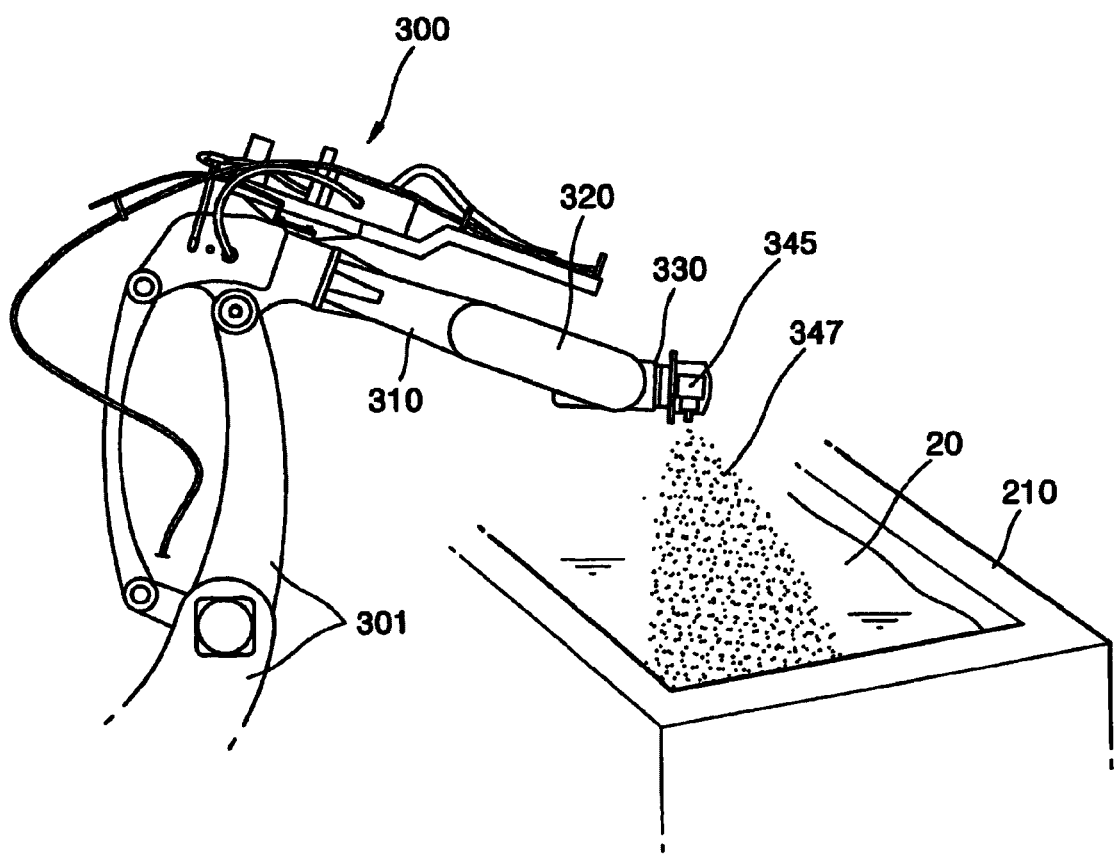
FIG. 14 is a view illustrating a state in which activating liquid is injected onto a first transfer sheet.

Also, an injection nozzle 345 injecting activating liquid onto the surface of the first transfer sheet 20 is provided at an end portion of the third arm 330. An activating liquid supply hose 346 supplying the activating liquid is connected to the injection nozzle 345. The first transfer by the first robot unit 300 is performed as follows. First, the activating liquid is injected through the injection nozzle 345 onto the upper surface of the first transfer sheet 20 supplied to the first transfer supply unit 200, as shown in FIG. 14. Here, the pattern printed layers 41 and 42 of the transfer sheet 20 are activated.

Figure 15:
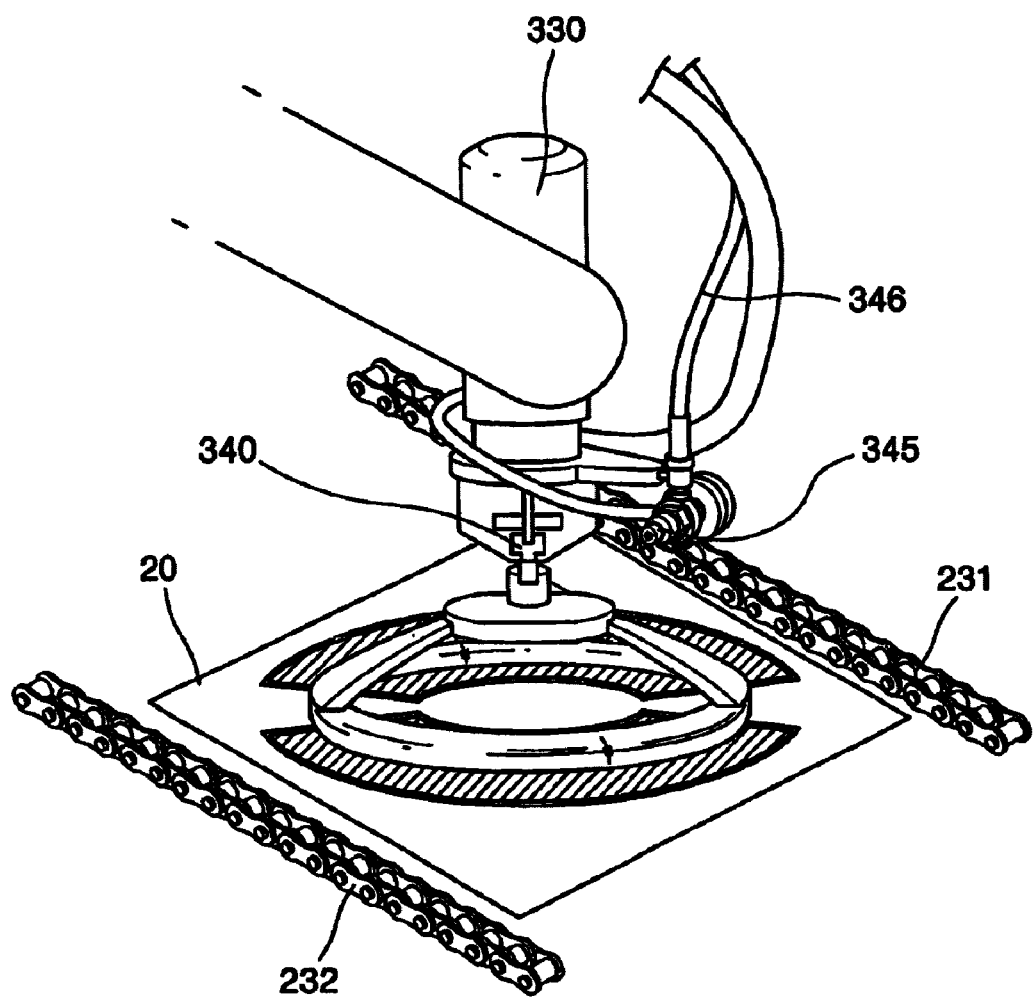
FIG. 15 is a perspective view illustrating a state in which the first transfer sheet is transferred to a wheel.

Next, the first robot unit 300 holds the boss 11 of the steering wheel 10 disposed at the escape position B (refer to FIG. 7) of the steering wheel supply unit 100 and moves the steering wheel 10 to a first transfer position, as shown in FIG. 15.

The steering wheel 10 is lowered by the first robot unit 300, as shown in FIG. 16A and contacts the upper surface of the first transfer sheet 20 floating on the liquid. Here, the steering wheel 10 is lowered such that the half of the rim portion 13 of the steering wheel 10 can be encompassed by the first transfer sheet 20.

As a result, the first transfer sheet 20 activated by hydraulic pressure is transferred to the half of the rim portion 13 of the steering wheel 10 that is lowered.

Figure 16B:
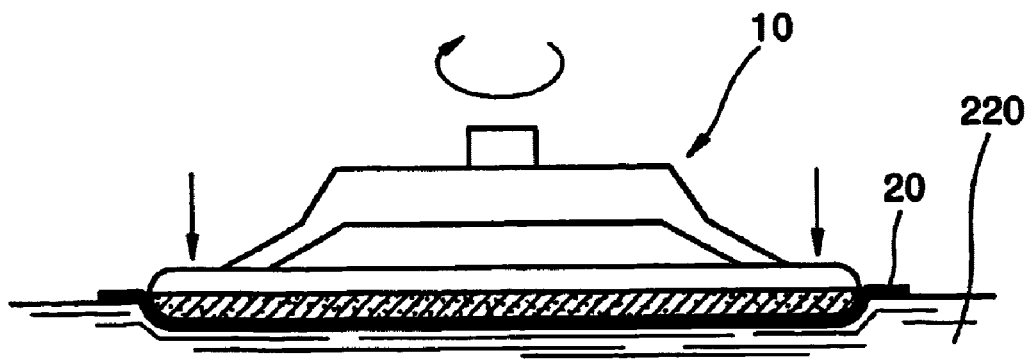

When the steering wheel 10 is held to perform the first transfer, as shown in FIGS. 16A and 16B, the steering wheel 10 is inclined by a predetermined angle so that the transfer begins from one side of the rim portion 13. In this case, generation of bubbles between the first transfer sheet 20 and the rim portion 13 is restricted so that a high quality steering wheel can be obtained.

When the steering wheel 10 is separated from the first transfer sheet 20 after the hydraulic pressure transfer is performed, as shown in FIG. 17, part of the first transfer sheet 20 that is not transferred remains around the rim portion 13. In this state, the steering wheel 10 is moved to the foreign material removing unit 400.

Foreign Material Removing Unit 400

Figure 18:
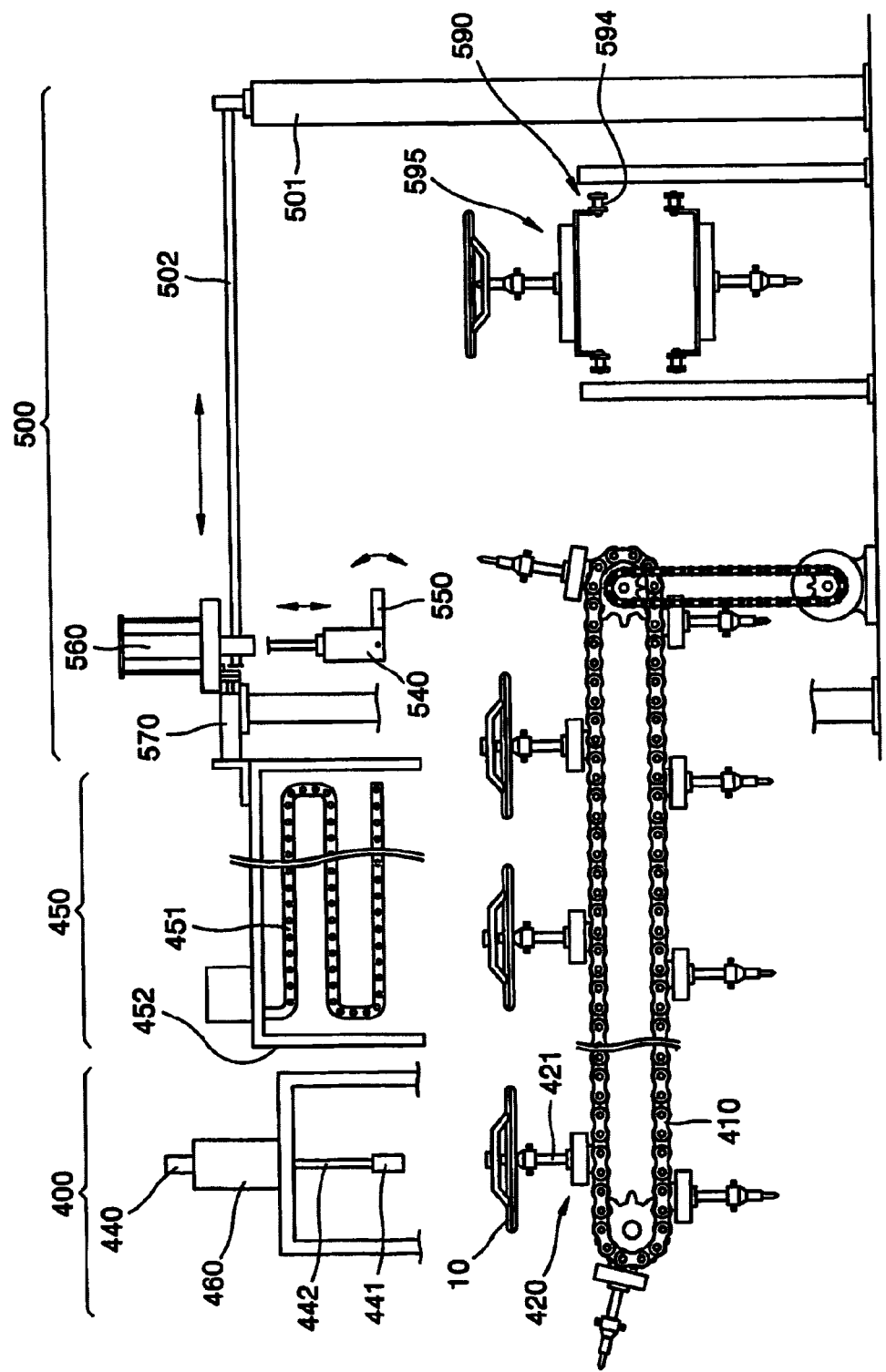
FIG. 18 is a schematic view illustrating a foreign material removing unit, a drying unit, and a first flipping unit.
Figure 19:
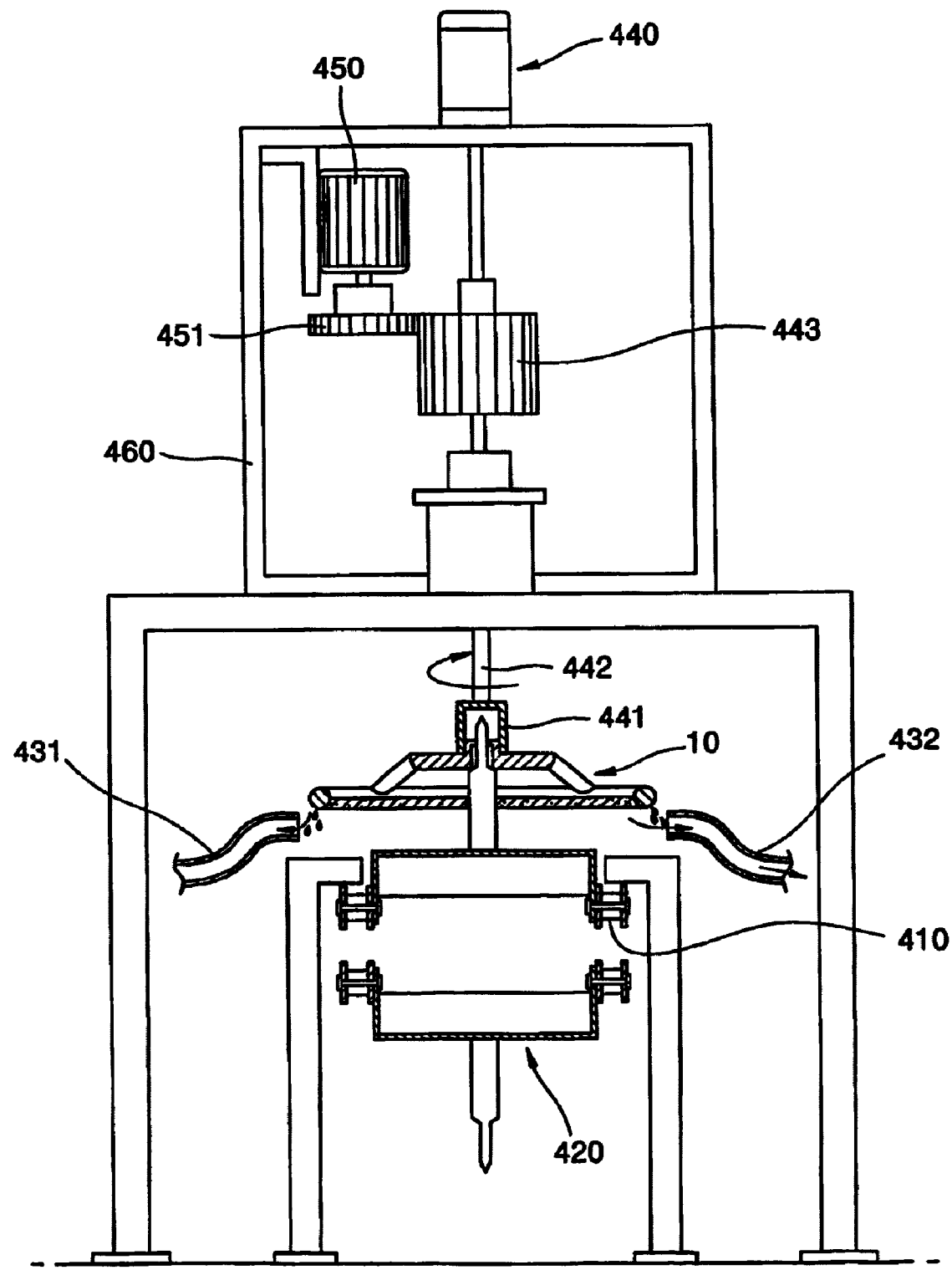
FIG. 19 is a view illustrating a state of removing foreign materials remaining on the rim portion of a wheel.
Figure 20:
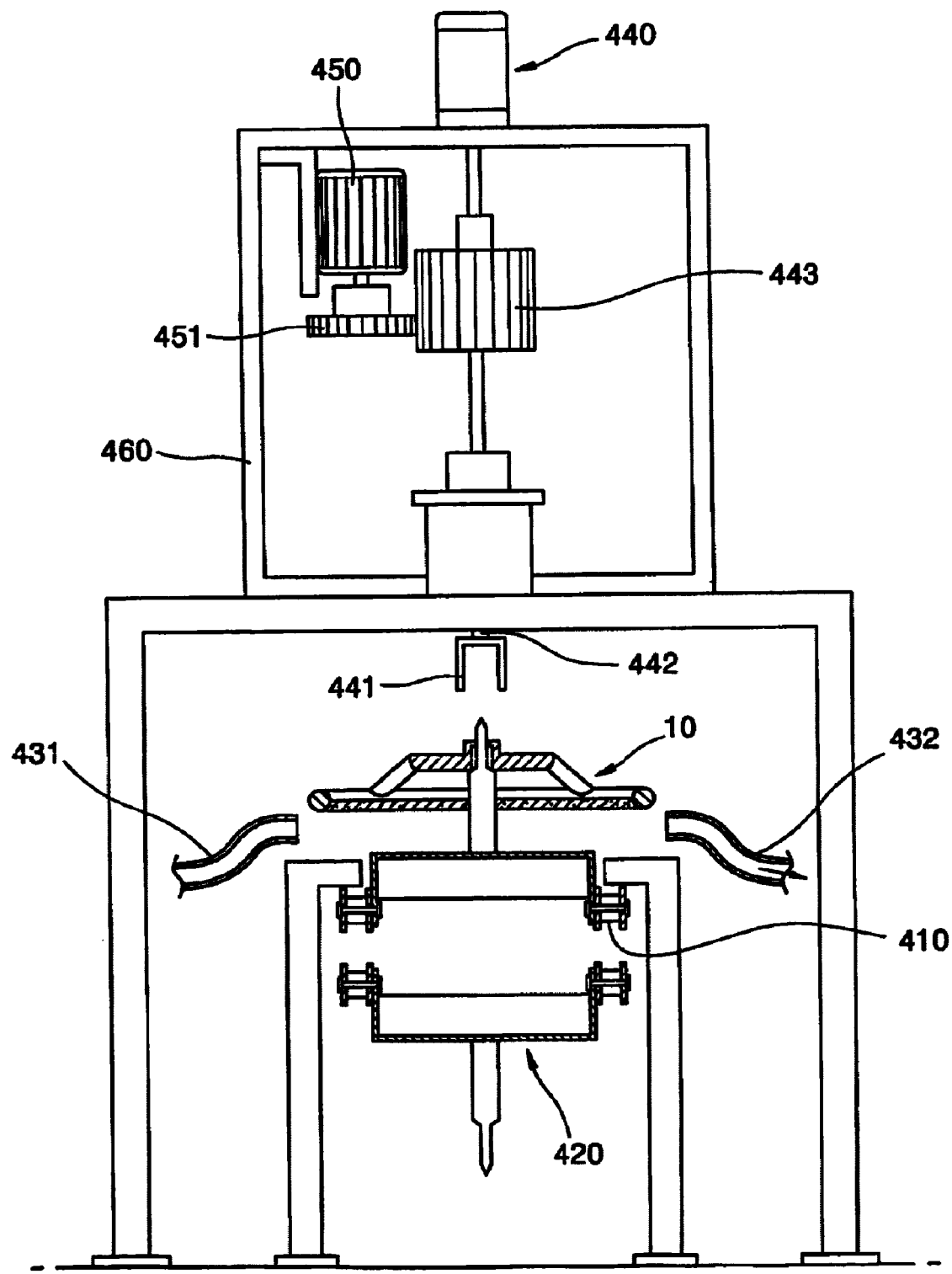
FIG. 20 is a view illustrating a state in which the removal of the foreign materials is completed.

Referring to FIGS. 18 through 20, the foreign material removing unit 400 includes a plurality of second carrier blocks 420 where the steering wheel 10 completed the first transfer as shown in FIG. 17 is moved by the first robot and accommodated. Each of the second carrier blocks 420 has a second post 421 coupled to the boss 11 of the wheel 10. The second carrier blocks 420 are fixed to a third chain belt 410 circulating along an endless path at a predetermined interval and moved together.

The third chain belt 410 circulates via the drying unit 450 and the first flipping unit 500 which will be described later.

Air hoses 431 and 432 for sucking foreign materials remaining on the steering wheel 10 are provided close to the rim portion 13 of the steering wheel 10 disposed at a foreign material removing position. The air hoses 431 and 432 is connected to a vacuum pump (not shown) to be capable of sucking air.

Also, a rotating means for rotating the steering wheel 10 during sucking the foreign material is provided.

The rotating means, as shown in FIG. 19, includes a first main cylinder 440 having a first cylinder rod 442, at an end portion of which a first coupling chuck 441 coupled to the boss 11 of the steering wheel 10 is formed, and rotating the steering wheel 10, a first elevating gear 443 coaxially coupled to the first cylinder rod 442 and moving up and down together, and a third driving motor 450 having a first motor gear 451 rotated by being engaged with the first elevating gear 443.

The foreign material removing unit 400 is operated as follows. First, as shown in FIG. 17, the steering wheel 10 is accommodated on the second carrier block 420 in a state in which the first transfer sheets 20 remain around the rim portion 13. The accommodated steering wheel 10 is detected by a sensor (not shown) and a detection signal drives the first main cylinder 440 and lowers the first coupling chuck 441.

As shown in FIG. 19, the lowered first coupling chuck 441 is coupled to the boss 11 of the steering wheel 10. Then, the third driving motor 450 is driven to rotate the steering wheel 10 and simultaneously the air hoses 431 and 432 suck and remove the first transfer sheet remaining around the steering wheel 10.

When the removal of the remaining steering wheel 20 is completed, the third driving motor 450 is stopped and, as shown in FIG. 20, the first coupling chuck 441 is lifted and separated from the boss 11 by the operation of the first main cylinder 440. In this state, the third chain belt 410 is driven and the steering wheel 10 is moved to the drying unit 450.

Drying Unit 450

The steering wheel 10 passing the foreign material removing unit 400 is accommodated on the second carrier block 420 and moved to the drying unit 450 by the third chain belt 410. The drying unit 450, as shown in FIGS. 7 and 18, is disposed between the foreign material removing unit 400 and the first flipping unit 500. The steering wheel 10 is moved by the third chain belt 410 continuously passing the foreign material removing unit 400, the drying unit 450, and the first flipping unit 500.

The drying unit 450 includes the chamber 452 formed along the third chain belt 410. A pipe 451 through which hot wind is discharged is provided in the chamber 452 in FIG. 18, parts of the chamber 452 and the pipe 451 are omitted.

The steering wheel 10 passing the chamber 452 is dried by hot wind and moved to the first flipping unit 500.

First Flipping Unit 500

The first flipping unit 500 flips the steering wheel 10 which is moved in the state shown in FIG. 4 to be a state shown in FIG. 5. That is, the steering wheel 10 is flipped such that the first transfer sheet 20 transferred to the rim portion 13 faces upward.

Figure 21:
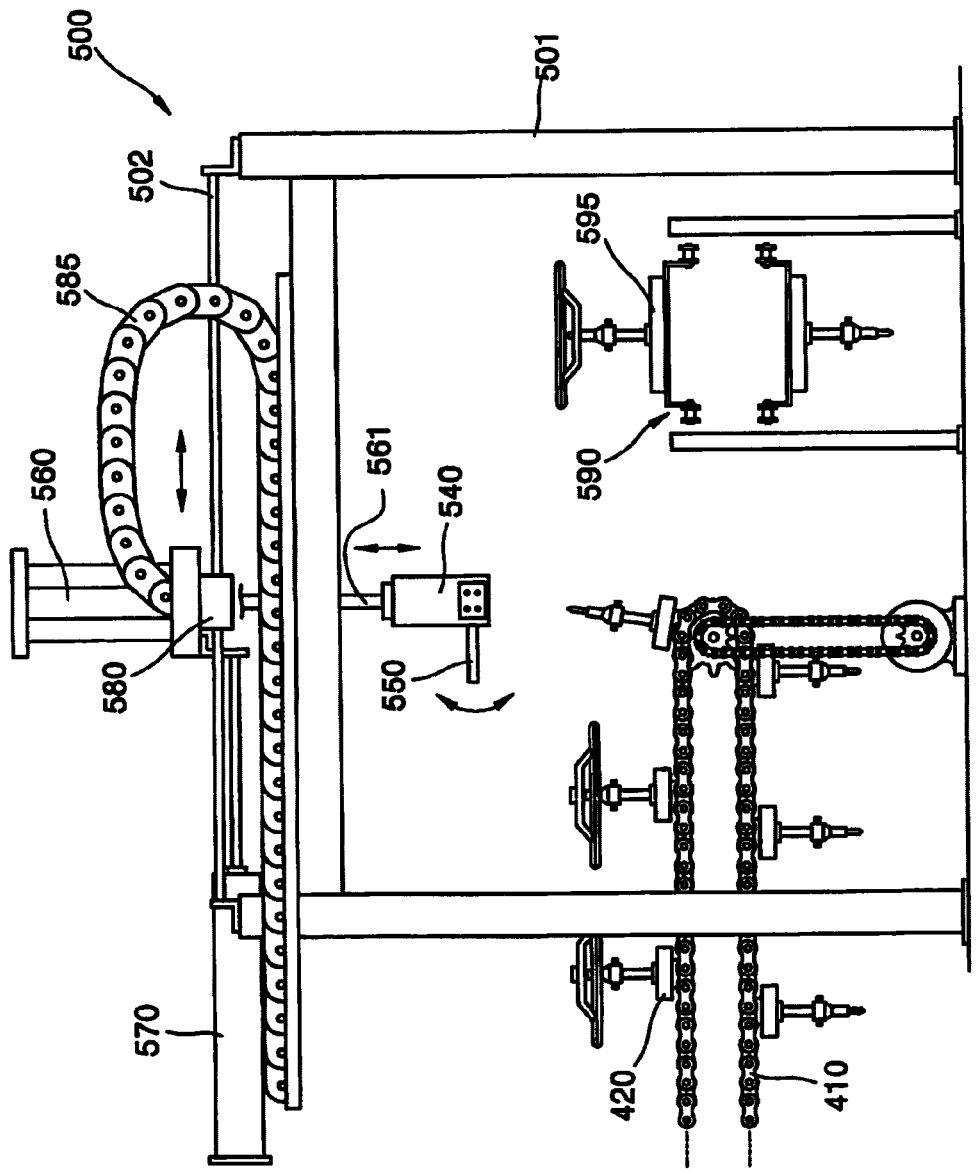
FIG. 21 is a view illustrating the first flipping unit.

Referring to FIGS. 7, 18, and 21, the first flipping unit 500 flips the steering wheel 10 and moves the flipped steering wheel 10 to the moving unit 590.

Figure 24:
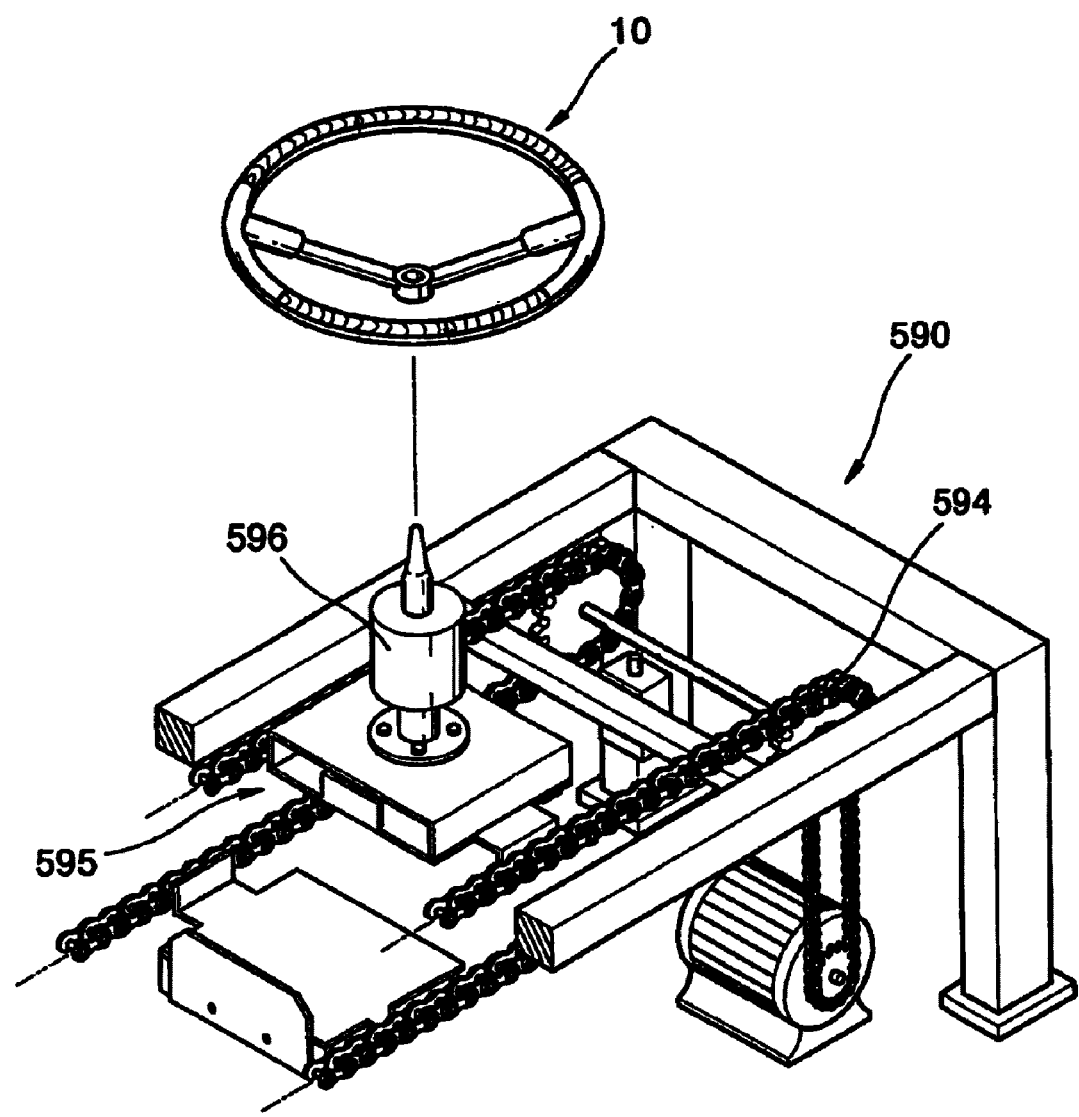
FIG. 24 is a perspective view illustrating a state in which the wheel flipped by the first flipping unit is accommodated on a third transfer block.

The moving unit 590 moves the flipped steering wheel 10 to a position close to the second transfer sheet supply unit 600. The moving unit 590, as shown in FIG. 24, includes a plurality of third carrier block 595 having a third head block 594 to which the boss 11 of the steering wheel 10 that is flipped is coupled, and a fourth chain belt 594 circulating along an endless path, on which the third carrier blocks 595 are fixed at a predetermined interval.

Figure 22:
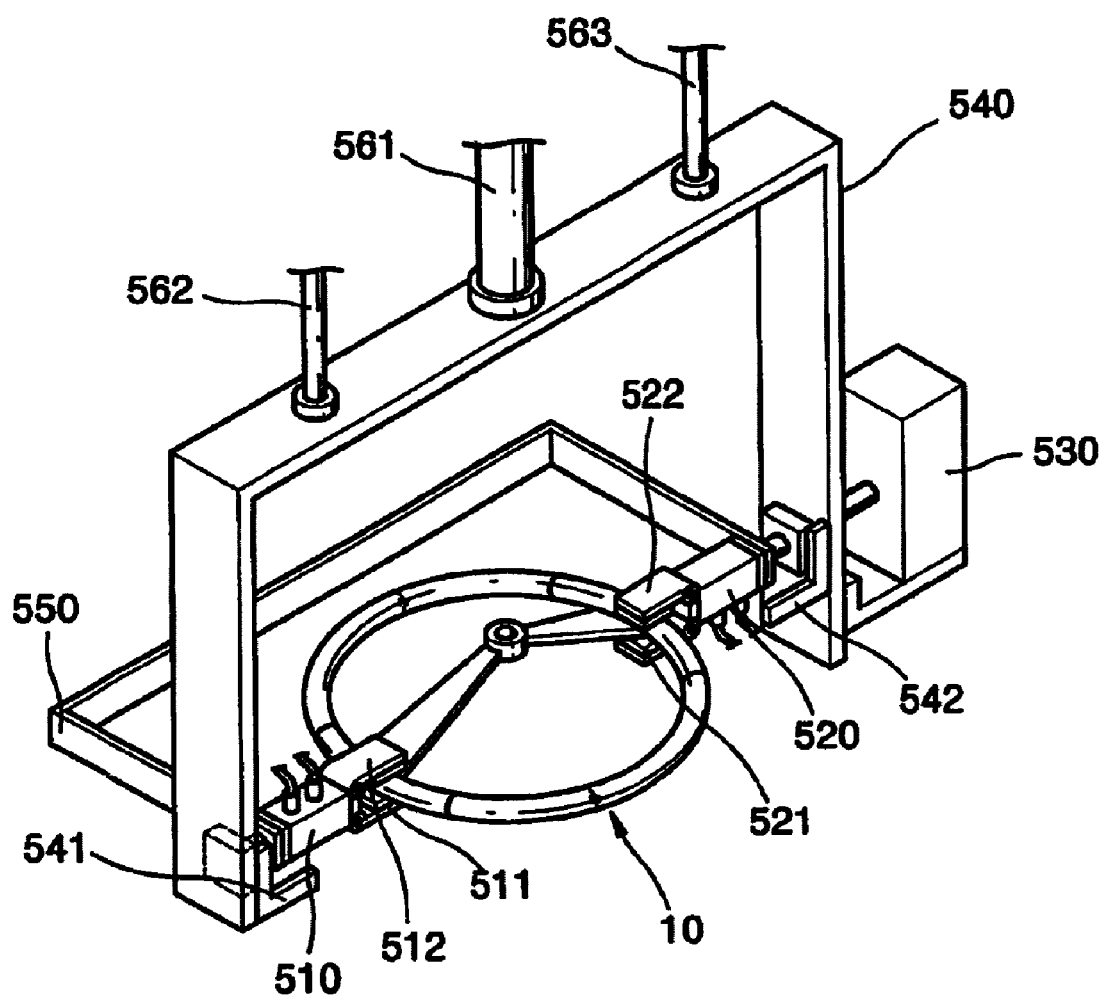
FIG. 22 is a perspective view illustrating a state of the steering wheel before being flipped by the first flipping unit.
Figure 23:
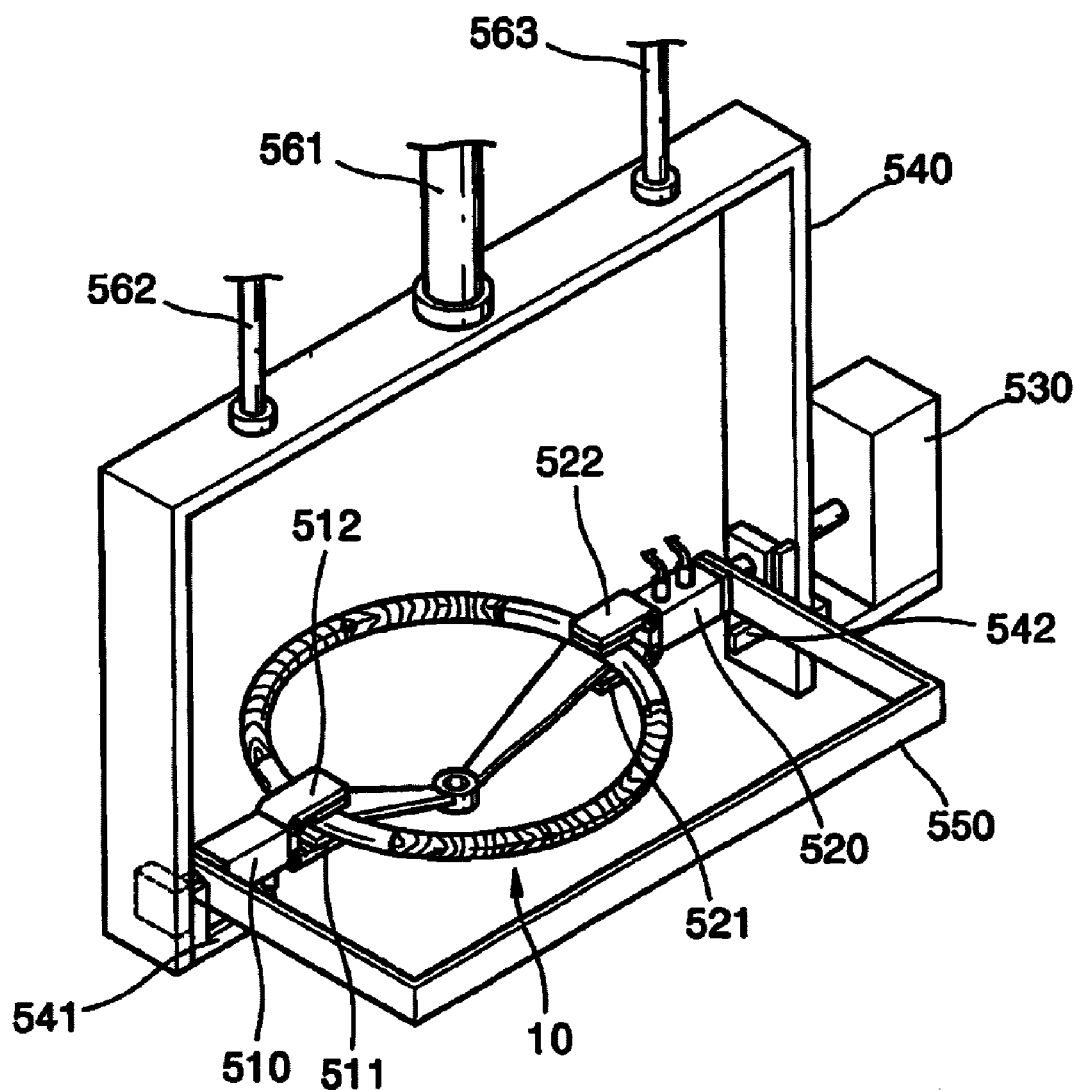
FIG. 23 is a perspective view illustrating a state in which the first flipping unit holds the flipped wheel.

Referring to FIGS. 21 through 23, the first flipping unit 500 includes first and second holding cylinders 510 and 520 having pairs of grips 511 and 512, and 521 and 522, holding the opposite sides of the steering wheel 10, a frame 540 for supporting the first and second holding cylinders 510 and 520 to be capable of rotating, a rotation cylinder 530 supported by the frame 540 and rotating the first and second holding cylinders 510 and 520, a second elevating cylinder 560 for elevating the frame 540, and a horizontal moving cylinder 570 for horizontally moving the second elevating cylinder 560 and the frame 540.

A guide shaft 502 for guiding a carrier block 580 where the second elevating cylinder 560 is supported is provided at a main support body 501. The horizontal moving cylinder 570 reciprocates the carrier block 580. Reference 585 denotes a guide for guiding a power line or pneumatic supply line connected to the second elevating cylinder 560.

Also, an arm member 550 is rotatably connected to the frame 540 to be rotated together the first and second holding cylinders 510 and 520. Stoppers 541 and 542 restricting a degree of rotation of the arm member 550 are provided.

The first flipping unit 500 is operated as follows. First, as shown in FIG. 22, the frame 540 is lowered by the operation of the second elevating cylinder 560 and then the steering wheel 10 is held by the operation of the first and second holding cylinders 510 and 520.

Next, after the frame 540 is lifted by the operation of the second elevating cylinder 560, the frame 540 holding the steering wheel 10 is moved above the third carrier block 595 of the moving unit 590. Then, the steering wheel 10 is flipped by the operation of the rotation cylinder 530, as shown in FIG. 23, and the frame 540 is lowered by the operation of the second elevating cylinder 560 so that the flipped steering wheel 10 is accommodated on the third carrier block 595, as shown in FIG. 21.

Figure 25:
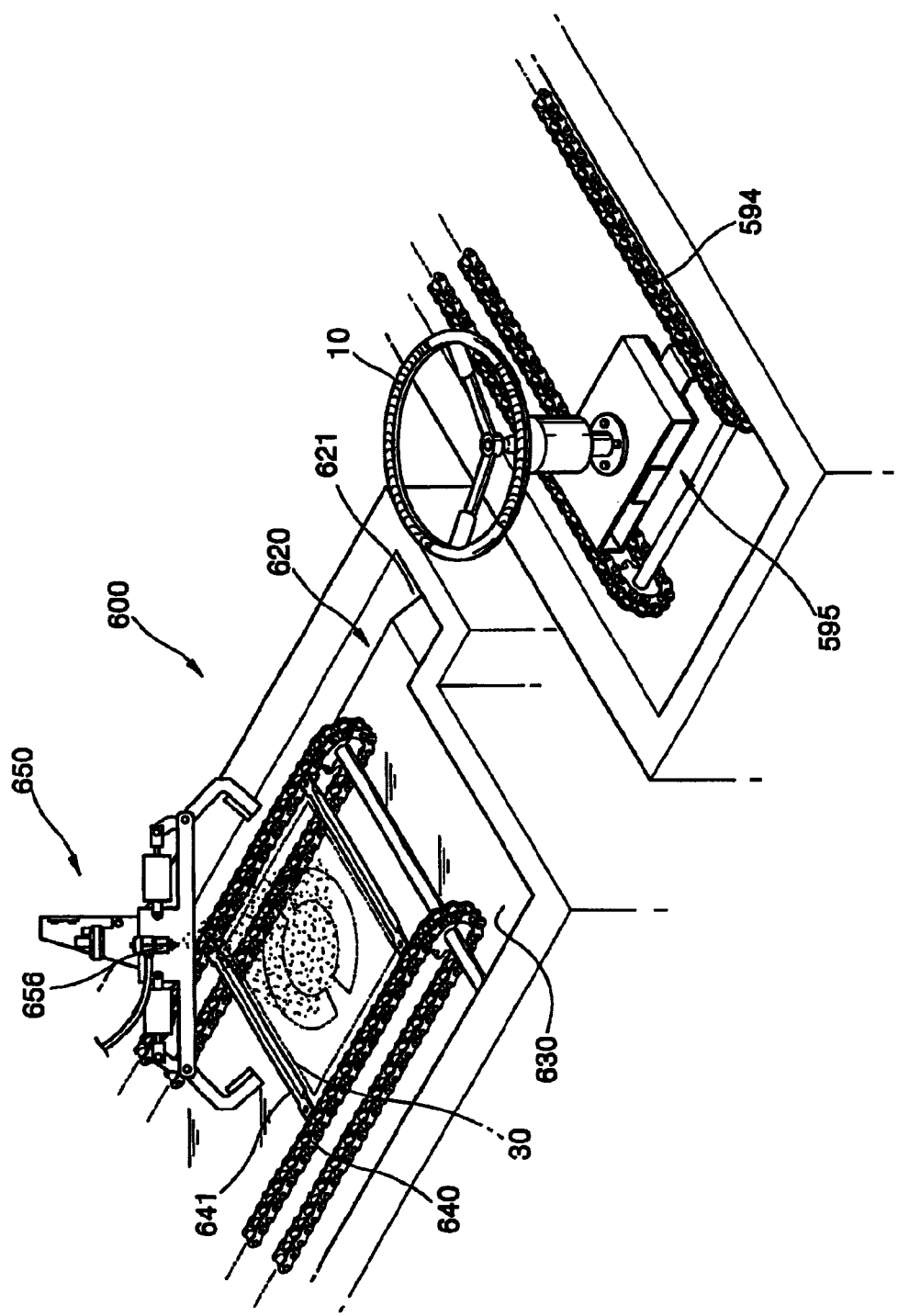
FIG. 25 is a perspective view illustrating a state in which activating liquid is injected onto a second transfer sheet.

The steering wheel 10 which is accommodated on the third carrier block 595 in the flipped state is moved to a position close to the second transfer sheet supply unit 600 by the operation of the fourth chain belt 594, as shown in FIG. 25.

Second Transfer Sheet Supply Unit 600

The second transfer sheet supply unit 600 has a similar structure to that of the first transfer sheet supply unit 200.

The second transfer sheet supply unit 600 is installed close to the moving unit 590. The second transfer sheet supply unit 600 includes a second tank 620 containing liquid 630, a pair of fifth chain belts 630 rotated together by being separated a predetermined distance from each other in the second tank 620, a driving motor (not shown) driving the fifth chain belts 640, and a plurality of second connection rods 641, each having both ends fixed to the fifth chain belts 640, provided at a predetermined interval and circulating on a surface of the liquid 630.

The second transfer sheet 30 is unfolded on the liquid 630 between the second connection rods 641 by a worker. The second transfer sheet 641 is moved by the second connection rods 641 which move together with the fifth chain belts 640, to the second transfer position in a state of floating on the liquid 630.

The moved second transfer sheet 30 stops at the second transfer position for a predetermined period of time and, after the activating liquid is injected by the second robot unit 650, a hydraulic pressure transfer is performed to the remaining portion of the rim portion 13 by holding the steering wheel 10 supplied from the moving unit 590.

After the hydraulic pressure transfer is completed, the second transfer sheet 30 remaining on the liquid 630 is discharged through a second discharge hole 621 of the second tank 620. Also, the second discharge hole 621 maintains a constant surface level of the liquid in the second tank 620.

Second Robot Unit 650 and Second Transfer

Figure 26:
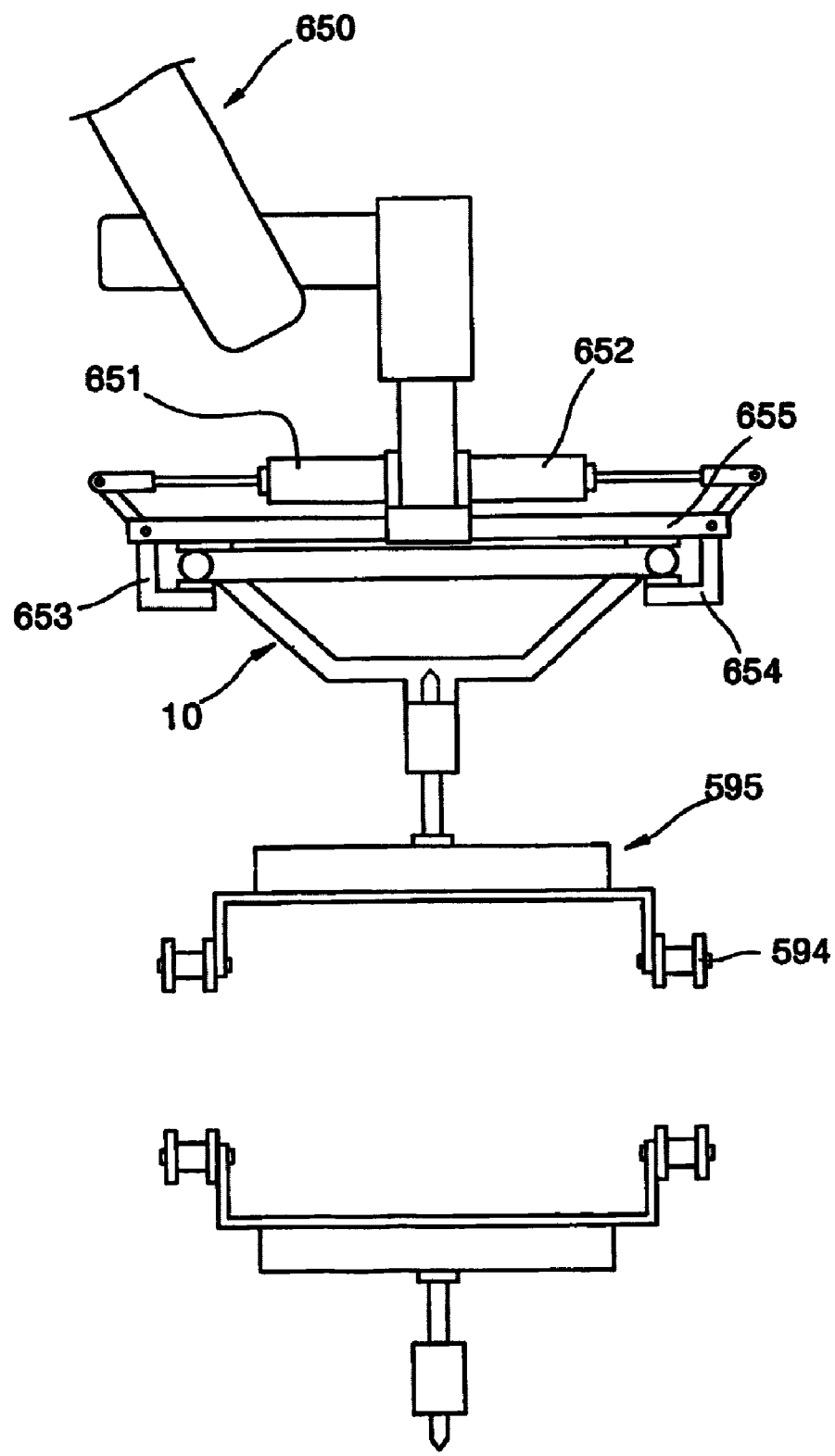
FIG. 26 is a view illustrating a state in which a second robot holds the wheel.
Figure 44:
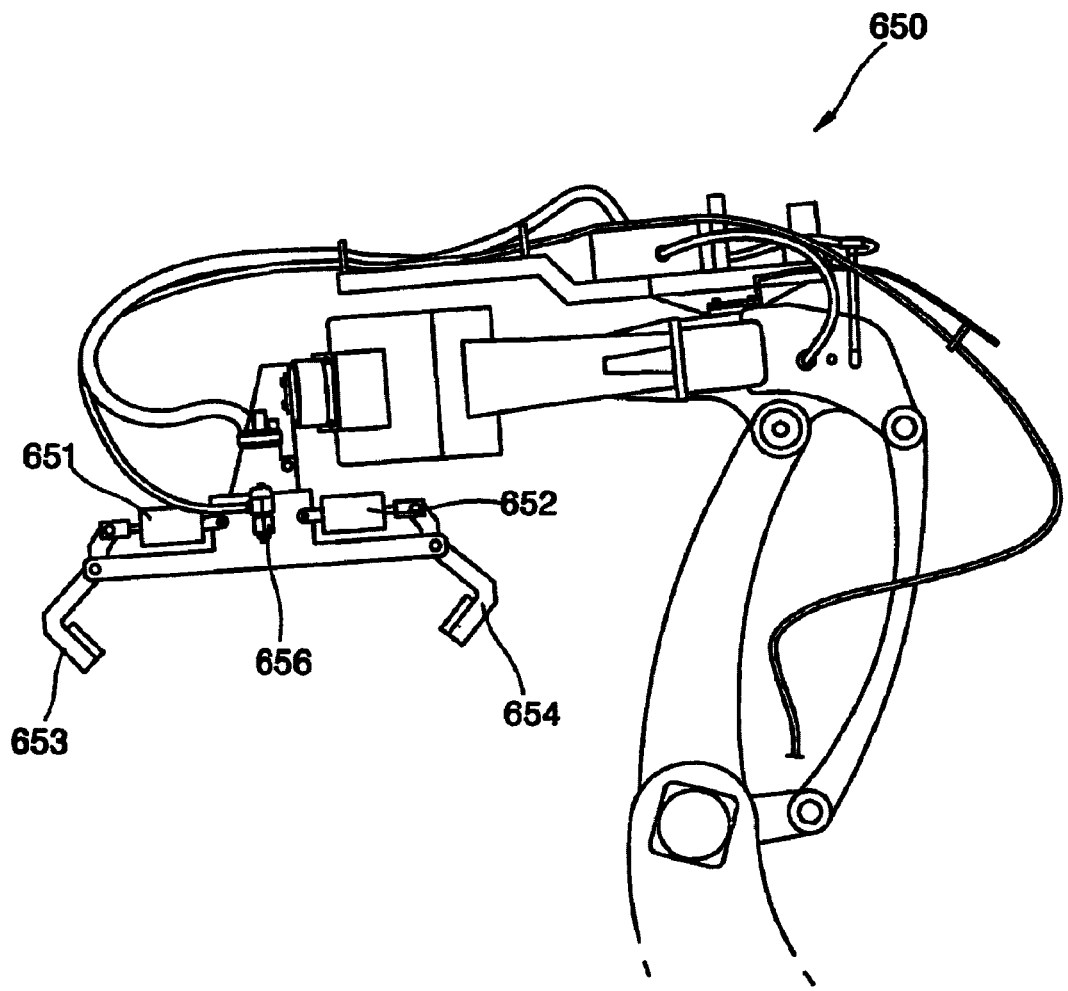
FIG. 44 is a perspective view illustrating a the second robot unit adopted in the present invention.

The second robot unit 650, as shown in FIGS. 26 and 44, is formed of a multi-joint capable of moving and tilting up and down, and left and right, by holding the steering wheel 10 by using an end portion thereof.

The second robot unit 650 includes a fixed bar 655 fixed to a last joint, first and second griping levers 653 and 654 rotatably supported at both ends of the fixed bar 655 and holding the steering wheel 10, and first and second operating cylinders 651 and 652 rotating the first and second gripping levers 653 and 654.

Also, the second robot unit 650, as shown in FIG. 25, includes an injection nozzle 656 for injecting activating liquid onto the surface of the second transfer sheet. When the activating liquid is injected before transfer is performed, the printed layers 41 and 42 are activated.

As shown in FIGS. 25 and 26, the steering wheel 10 accommodated on the third carrier block 595 of the moving unit 590 and moved thereby is held by the second robot unit 650 and moved to the second transfer position. Here, the second robot unit 650 holds the connection portions a and b of the steering wheel 10 by the operation of the first and second operating cylinders 651 and 652.

Figure 27:
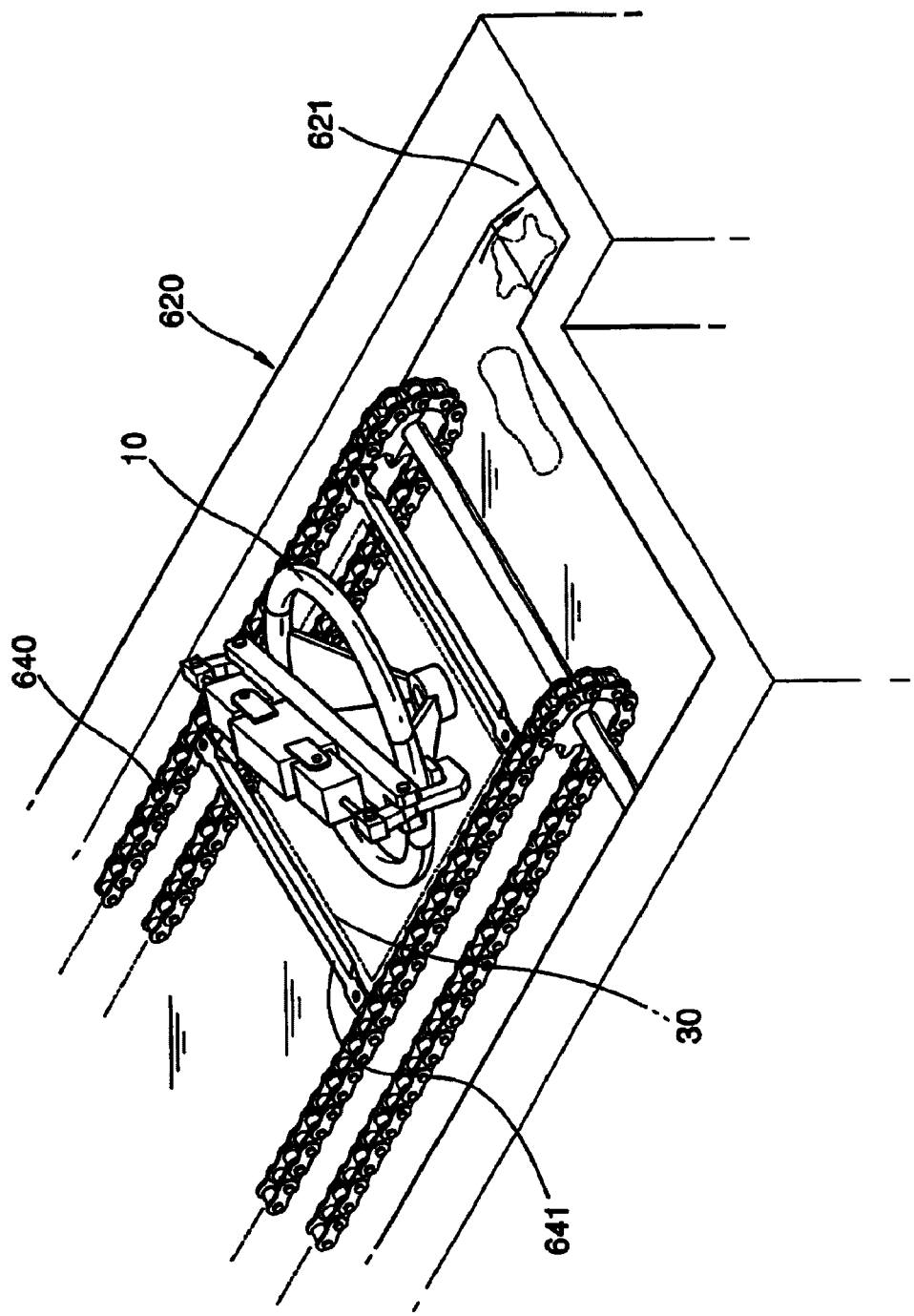
FIG. 27 is a perspective view illustrating a state in which the second robot holding the wheel transfers the second transfer sheet to one side of the wheel.
Figure 28:
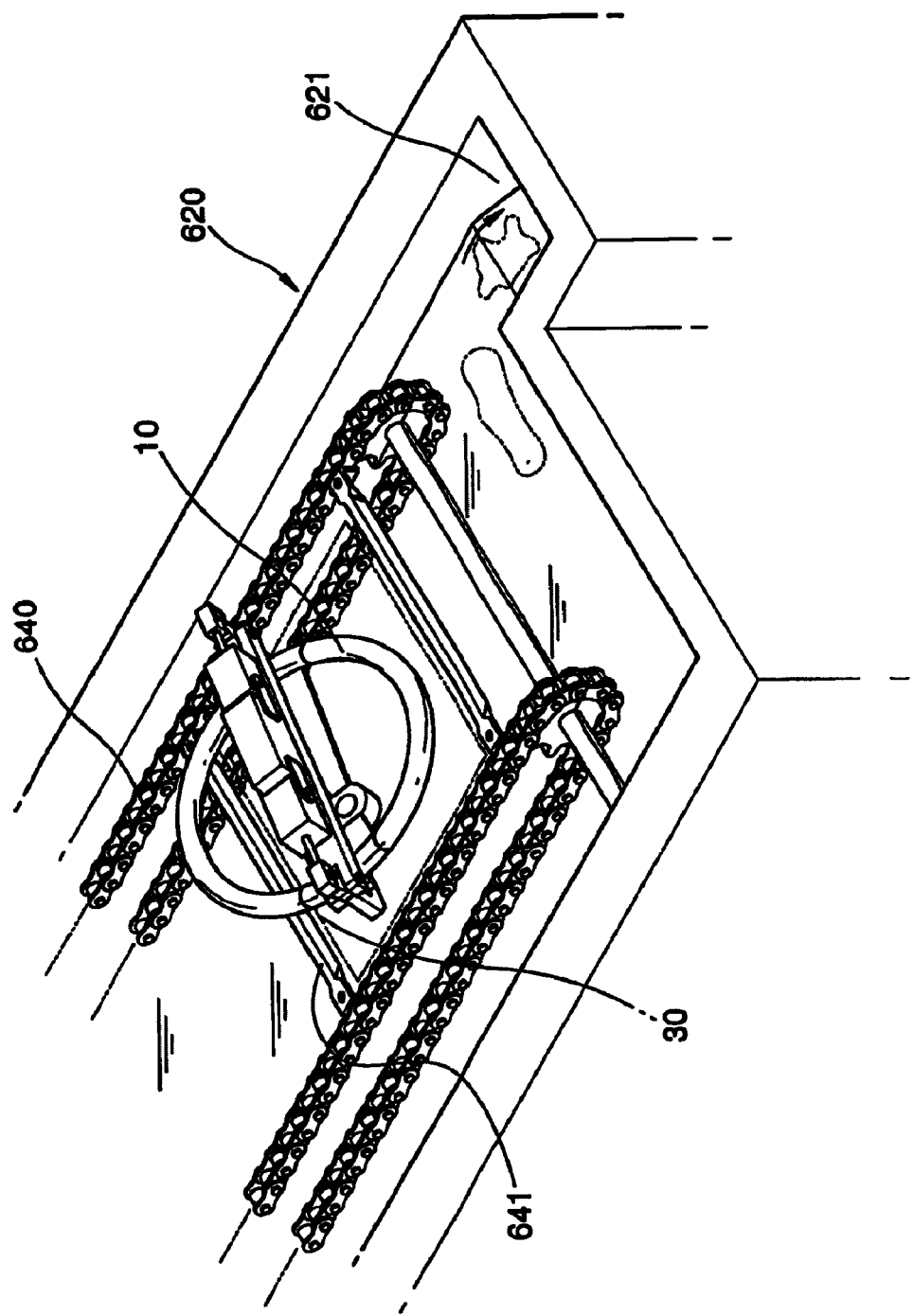
FIG. 28 is a perspective view illustrating a state in which the second robot holding the wheel transfers the second transfer sheet to the other side of the wheel.
Figure 29:
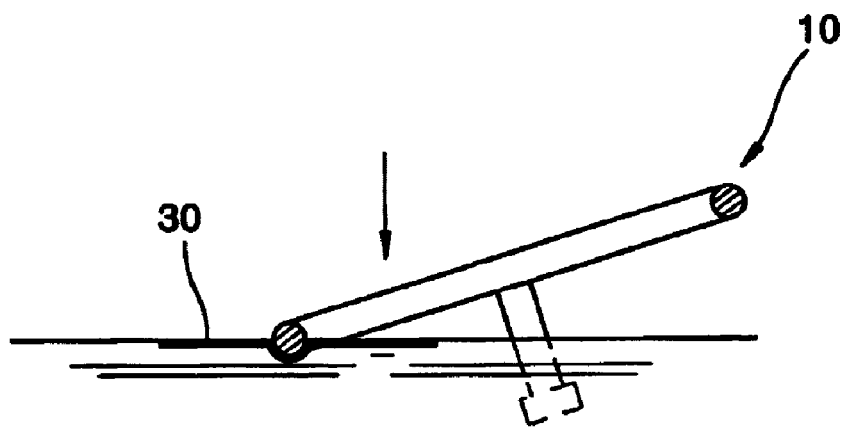
FIG. 29 is a schematic view illustrating a state of transferring shown in FIG. 27.
Figure 30:
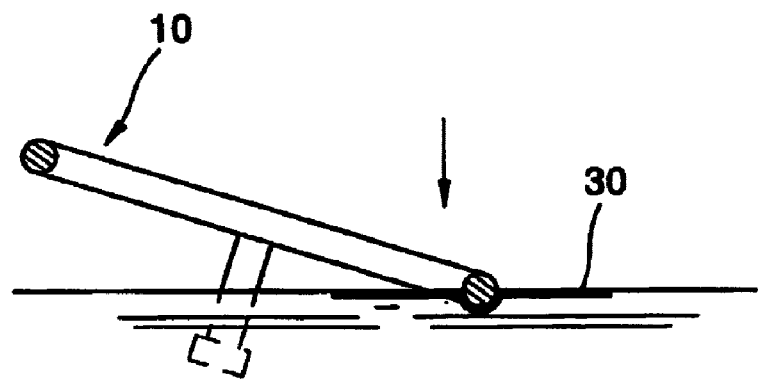
FIG. 30 is a schematic view illustrating a state of transferring shown in FIG. 28.

The second robot unit 650 holding the steering wheel 10, as shown in FIGS. 27 and 29, is inclined to one side and descends so that transfer is performed to the other side surface of the rim portion c (refer to FIG. 1) where the first transfer sheet 20 is not transferred. Next, as shown in FIGS. 28 and 30, as the second robot unit 650 is inclined to the other side and descends, transfer is performed to the other surface of the other rim portion d (refer to FIG. 1).

As the steering wheel 10 is tilt to the left and right, transfer is performed to the rim portions c and d. Then, the steering wheel 10 is moved to the second flipping unit 700 by the second robot unit 650.

Second Flipping Unit 700

Figure 31:
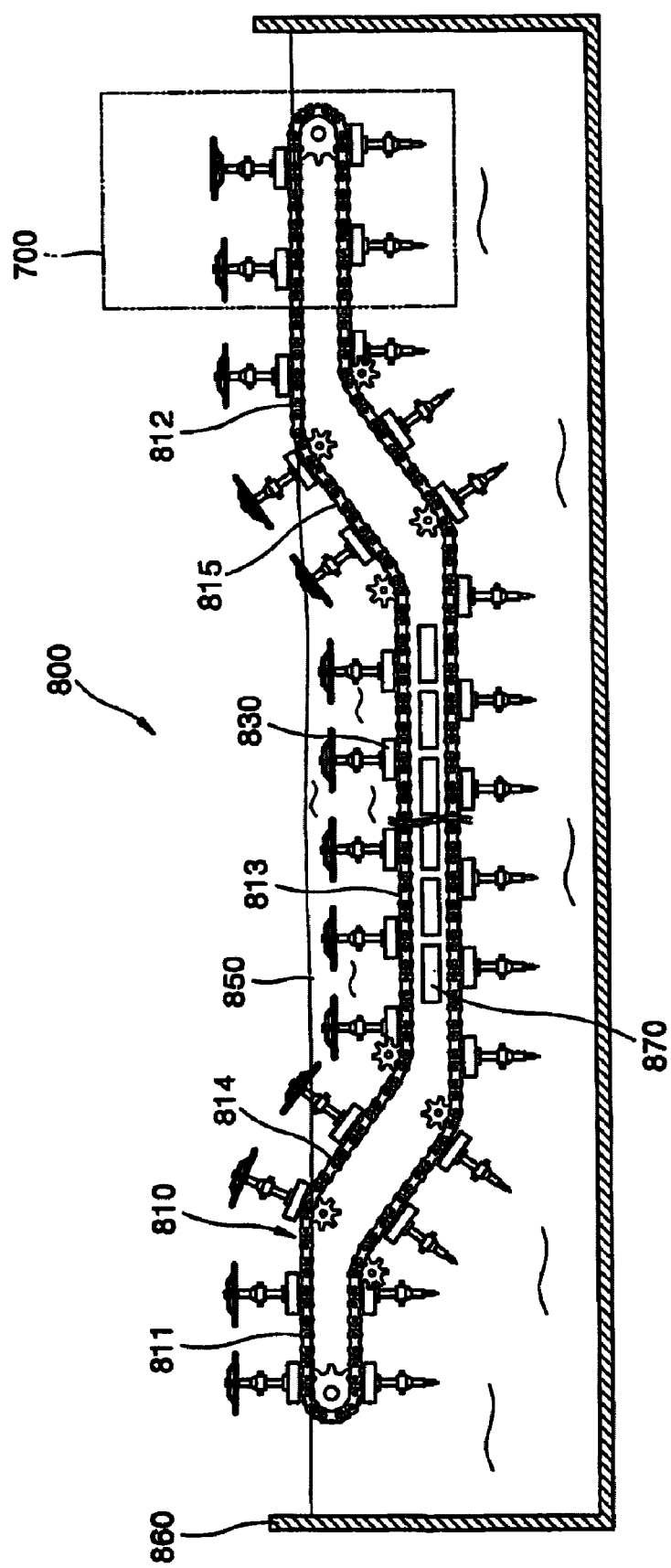
FIG. 31 is a view illustrating a first cleaning unit.

The second flipping unit 700, as shown in FIGS. 7 and 31, is provided at an entrance portion of the first cleaning unit 800 to be described later. The second flipping unit 700 supplies the steering wheel 10 moved in the state shown in FIG. 5 during the second transfer to the first cleaning unit 800 in the state shown in FIG. 4.

Figure 32:
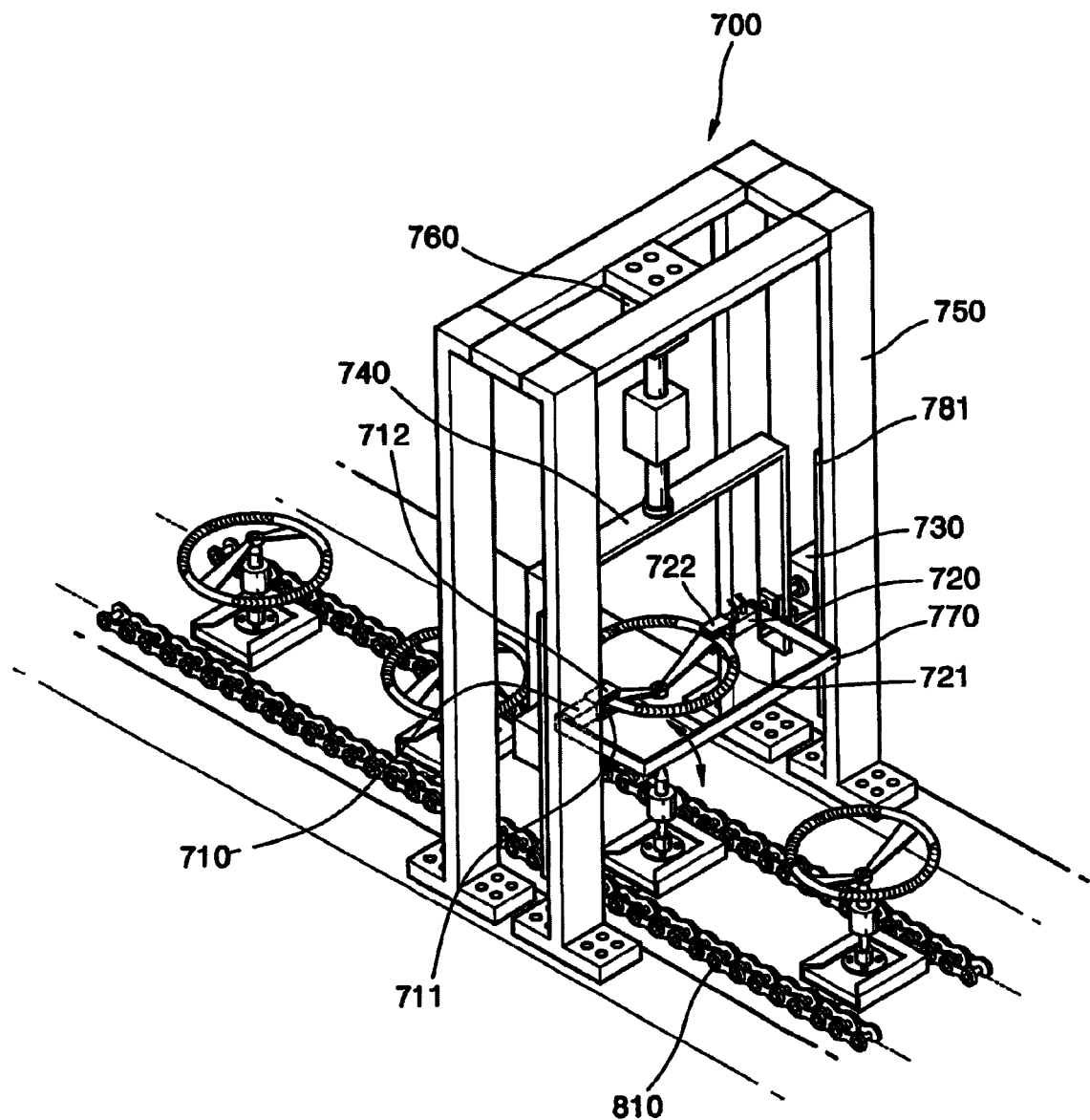
FIG. 32 is a perspective view illustrating a second flipping unit before the wheel is flipped.
Figure 33:
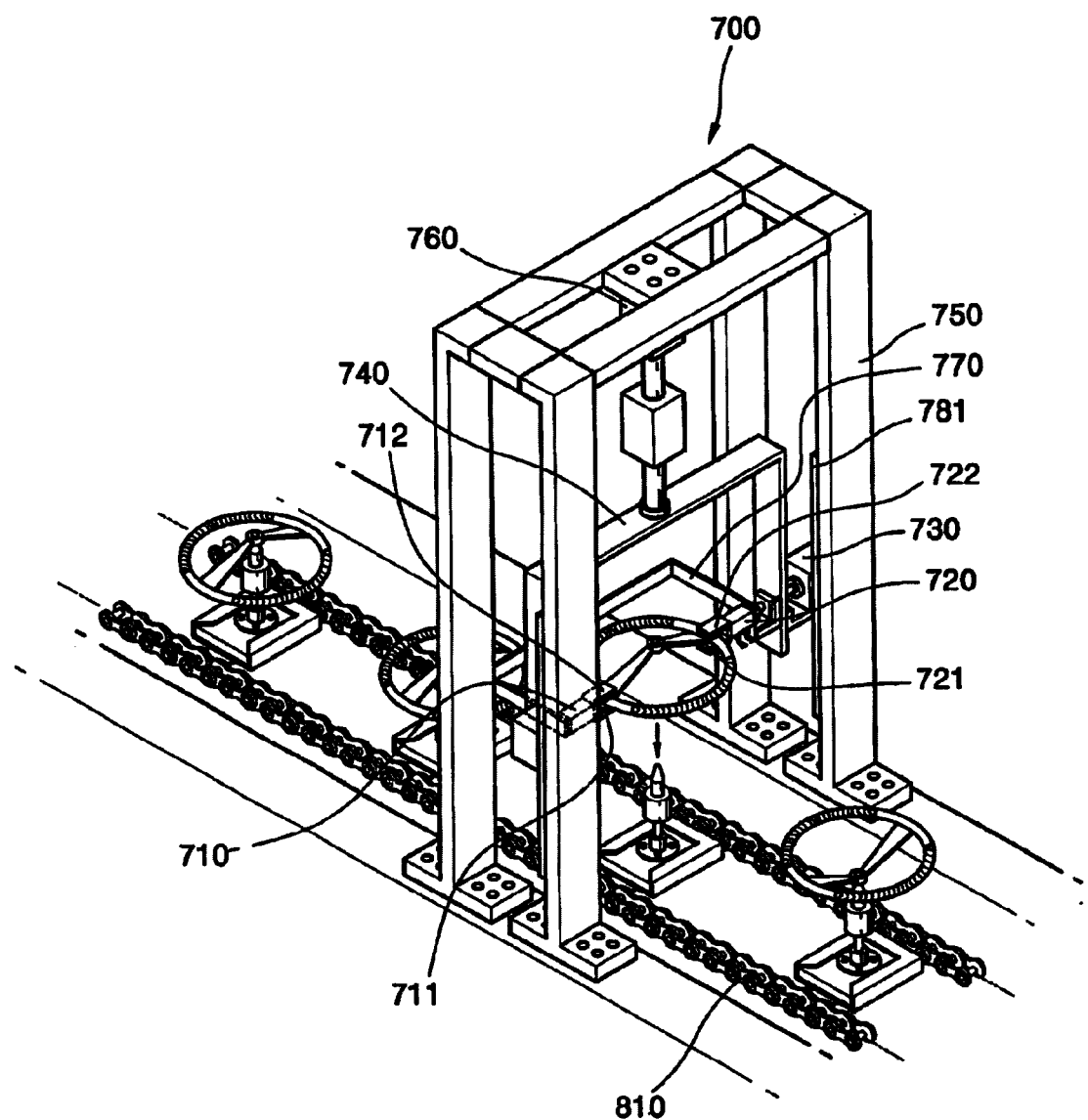
FIG. 33 is a perspective view illustrating the second flipping unit after the wheel is flipped.
Figure 34:
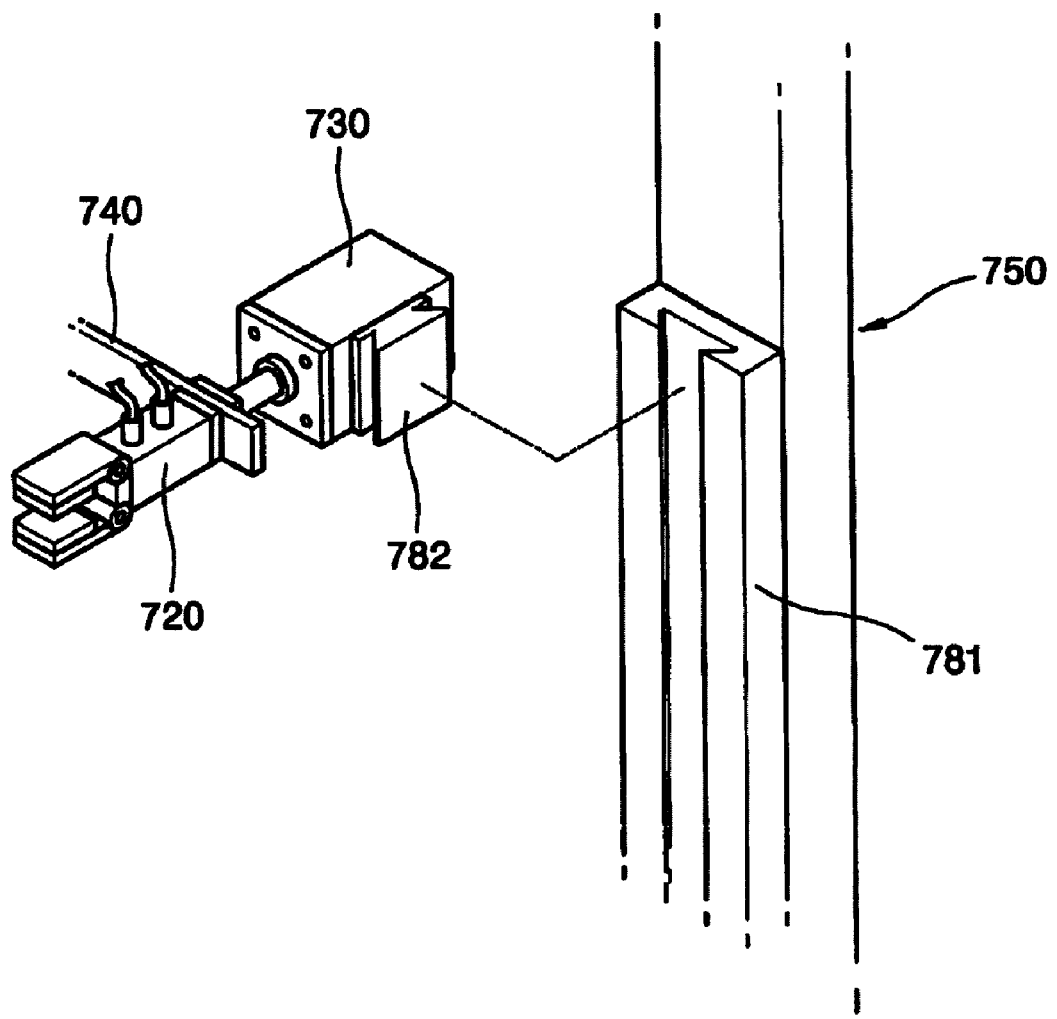
FIG. 34 is a perspective view illustrating a guide structure of a frame in the second flipping unit.

The second flipping unit 700 has a similar structure to that of the first flipping unit 500. The flipping unit 700, as shown in FIGS. 32 through 34 includes third and fourth holding cylinders 710 and 720 having pairs of grips 711 and 712, and 721 and 722, holding the opposite sides of the steering wheel 10, a frame 740 for supporting the third and fourth holding cylinders 710 and 720 to be capable of rotating, a rotation cylinder 730 supported by the frame 740 and rotating the third and fourth holding cylinders 710 and 720, and a third elevating cylinder 760 for elevating the frame 740. The third elevating cylinder 760 is fixed to an upper end of a fixed support frame 750.

A guide rail 781 is fixed to the fixed support frame 750 to be vertically lengthy. A guide block 782 coupled to the guide block 781 to be capable of sliding is coupled to the rotation cylinder 730. Thus, the frame 740 and the steering wheel 10 can be stably elevated by the third elevating cylinder 760.

Also, an arm member 770 rotating together with the third and fourth holding cylinders 710 and 720 is provided at the frame 740. The arm member 770 is rotated when the steering wheel 10 is flipped so that the steering wheel 10 can be stably rotated.

Figure 35:
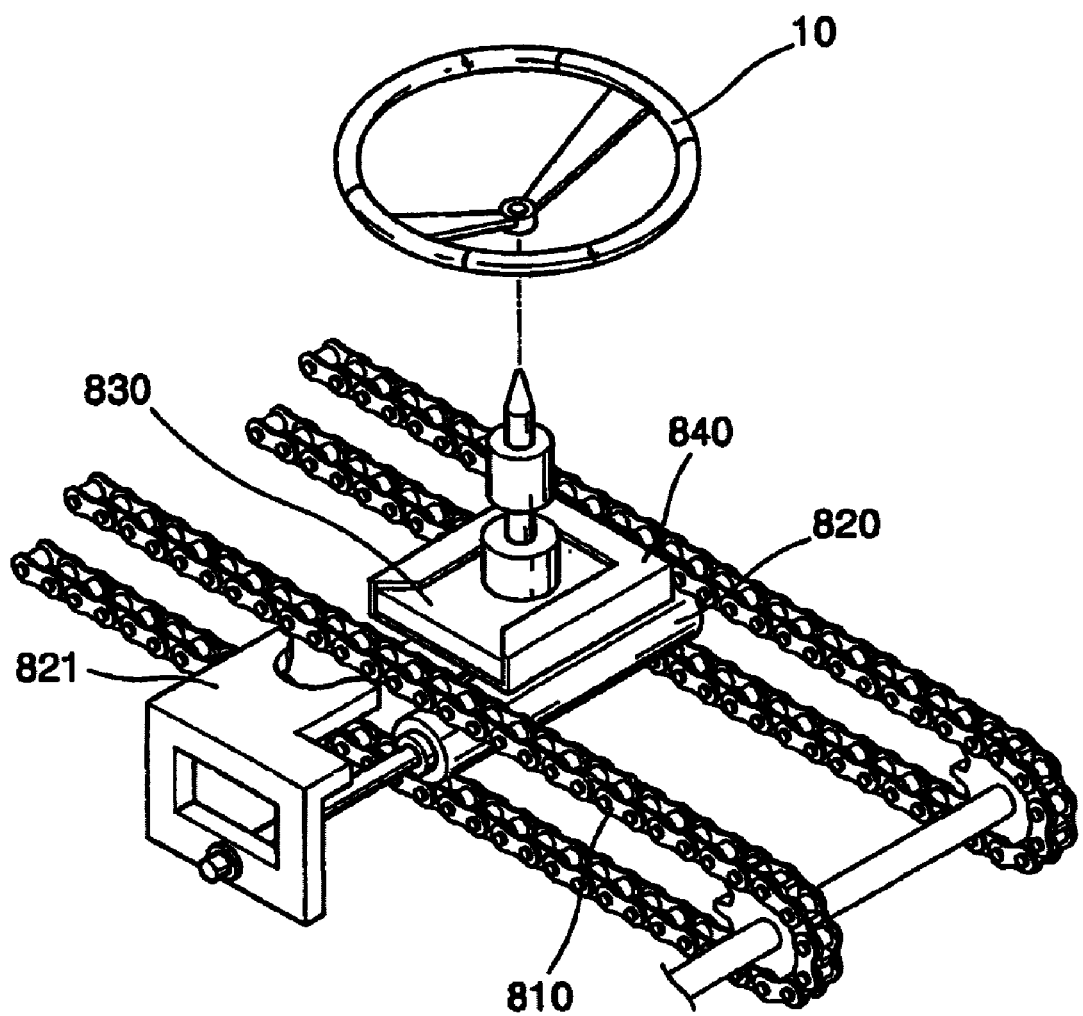
FIG. 35 is a perspective view illustrating a state before a fourth transfer block where the wheel on which the second transfer sheet is transferred is accommodated is fixed.
Figure 36:
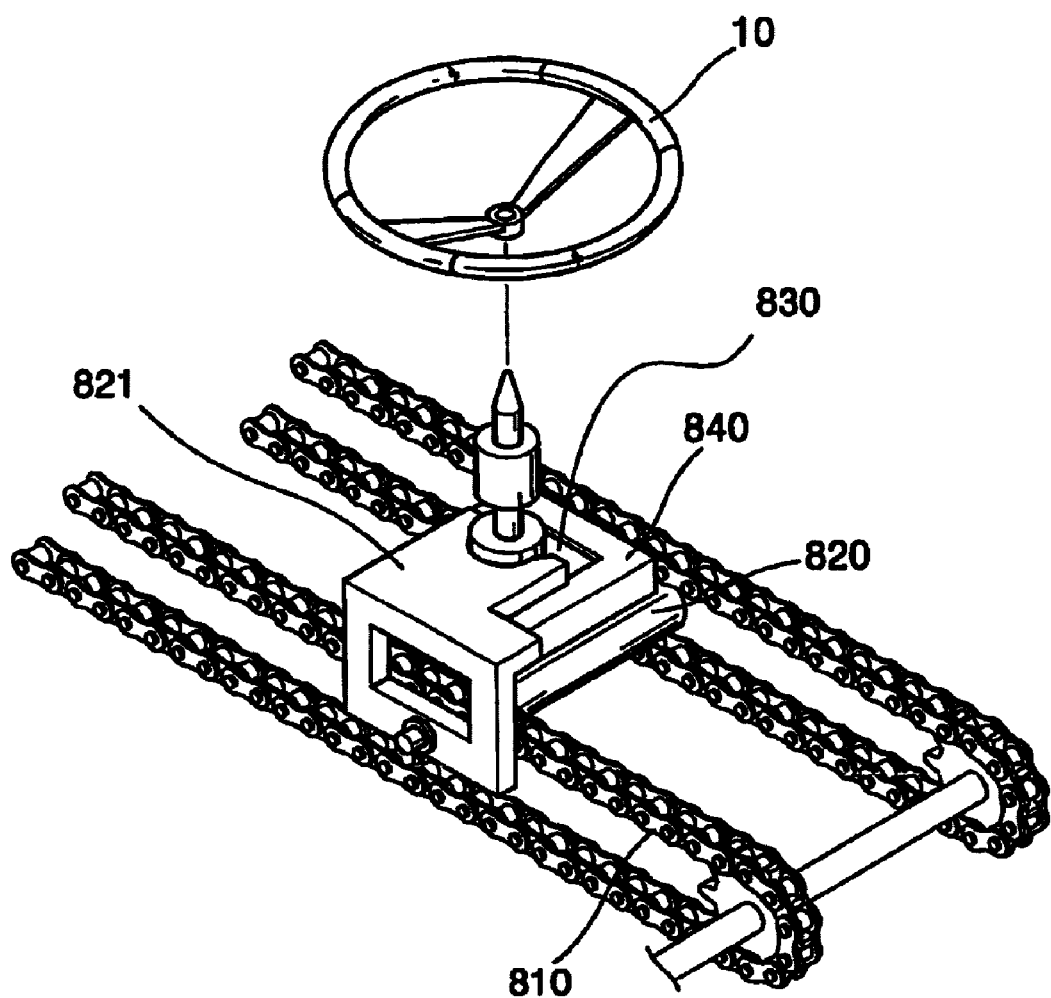
FIG. 36 is a perspective view illustrating a state after the fourth transfer block where the wheel on which the second transfer sheet is transferred is accommodated is fixed.
Figure 37:
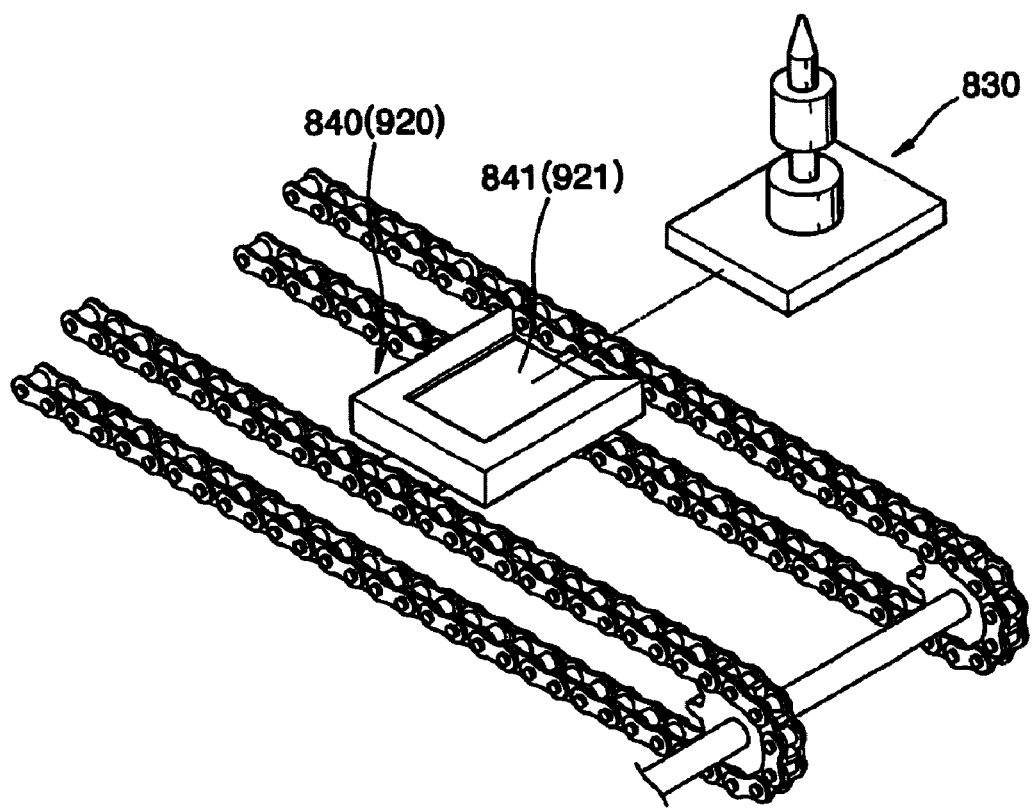
FIG. 37 is a perspective view illustrating a transfer block and a block case accommodating the transfer block.

The second flipping unit 700 and the first cleaning unit 800 to be described later share a sixth chain belt 810 circulating along an endless path. As shown in FIGS. 35 through 37, a first block case 840 is connected on the sixth chain belt 810 at a predetermined interval to rotate together. A fourth carrier block 830 where the steering wheel 10 is accommodated is coupled to the first block case 840 to be capable of sliding in and out.

The steering wheel 10 having the second transfer completed is accommodated on the fourth carrier block 830 in a state of being held by the second robot unit 650. Here, the fourth carrier block 830 is fixed by a fixing means for stable accommodation.

The fixing means includes a cylinder 820 provided at an end portion of the sixth chain belt 810, and a moving block 821 fixed on a rod of the cylinder 820 and moved by the operation of the cylinder 820 to press the fourth carrier block 830.

The steering wheel 10 stably accommodated on the fourth carrier block 830 is moved to the second flipping position as the sixth chain belt 810 circulates.

When the steering wheel 10 accommodated on the fourth carrier block 830 is moved to the second flipping position, due to the detection by a sensor (not shown), the third elevating cylinder 760 is operated to descends the frame 740 and the steering wheel 10 is held by the operation of the third and fourth holding cylinders 710 and 720. Next, the frame 740 is lifted by the operation of the third elevating cylinder 760, as shown in FIG. 32. Then, as shown in FIG. 33, the frame 740 is rotated by 180° by the operation of the rotation cylinder 730 so that the steering wheel 10 is flipped. Then, the frame 740 descends so that the steering wheel 10 is accommodated on the fourth carrier block 830. Here, the frame 740 and the steering wheel 10 are guided along the guide rail 781 to be stably elevated.

The flipped steering wheel 10 accommodated on the fourth carrier block 830 is supplied to the first cleaning unit 800.

First Cleaning Unit 800

The first cleaning unit 800 cleans foreign materials such as remaining transfer sheets remaining on an outer circumferential surface of the steering wheel 10 where the first and second transfer sheets 20 and 30 are transferred using hydraulic pressure, by using an supersonic wave.

Referring to FIGS. 7 and 31, the first cleaning unit 800 includes a third tank 860 containing cleaning liquid 850, the sixth chain belt 810 circulating along an endless path in the third tank 860, the fourth carrier block 830 moving together by being connected to the sixth chain belt 810 at a predetermined interval and supporting the steering wheel 10, and a plurality of supersonic wave oscillator 870 accommodated in the third tank 860 and generating a supersonic wave.

The sixth chain belt 810, as shown in FIG. 31, includes upper horizontal portions 811 and 812, a lower horizontal portion 813, and inclination portions 814 and 815 so that the steering wheel 10 can be sufficiently dipped in the cleaning liquid 850 while passing the lower horizontal portion 813.

While the fourth carrier block 830 where the steering wheel 10 is accommodated passes through the cleaning liquid 850, foreign materials existing on the steering wheel 10 is cleaned away by a supersonic wave oscillated from the supersonic wave oscillator 870. The steering wheel 10 and the fourth carrier block 830 which are cleaned escape from the cleaning liquid 850 and are moved to the second cleaning unit 900 to be described later.

Figure 38:
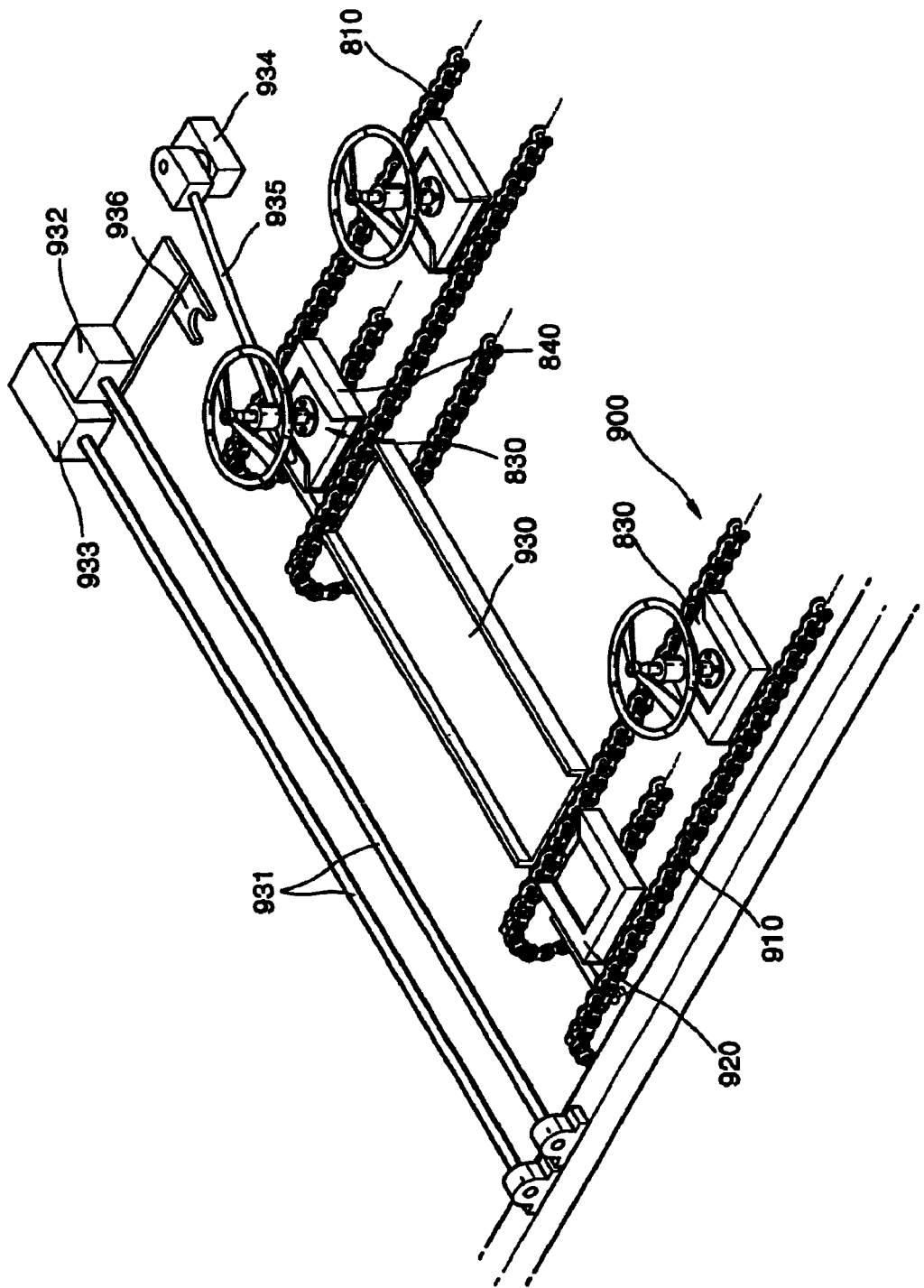
FIG. 38 is a perspective view illustrating a transfer means for transferring the first cleaned wheel to a second cleaning unit.
Figure 39:
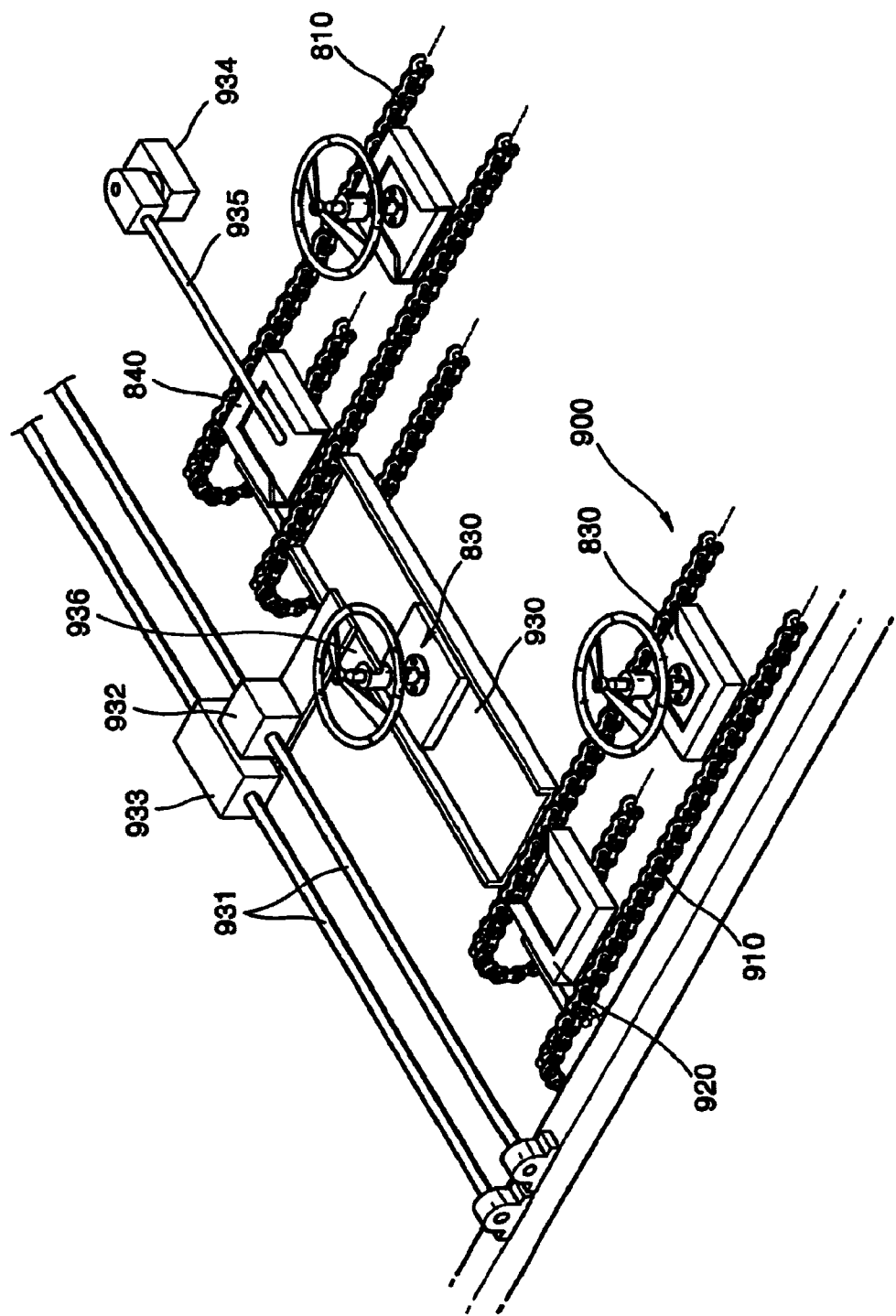
FIG. 39 is a perspective view illustrating a state in which the fourth carrier block is moved by the moving means.

The fourth carrier block 830 passing through the first cleaning unit 800 is moved to the second cleaning unit 900 by the following moving means 980 (refer to FIGS. 7, 38, and 39).

The moving means 980 is made as follows. First, the second cleaning unit 900 includes a seventh chain belt 910 driven parallel to the sixth chain belt 810.

A plurality of the first block cases 840 where the fourth carrier block 830 is accommodated are connected to the sixth chain belt 810 at a predetermined interval. Likewise, a plurality of second block cases 920 where the fourth carrier block 830 is accommodated are connected to the seventh chain belt 910 at a predetermined interval.

The first and second block cases 840 and 920, as shown in FIG. 37, have accommodation spaces 841 and 921 each having one open side so that the fourth carrier block 830 can slide in or out.

Referring to FIGS. 38 and 39, a first guide plate 930 for guiding the fourth carrier block 840 to slide from the first block case 840 to the second block case 920 is provided between the sixth chain belt 810 and the seventh chain belt 910. The fourth carrier block 830 where the steering wheel 10 is accommodated slides into the second block case 920 from the first block case 840 by a first pusher means.

The first pusher means includes a pair of first guide shafts 931 parallel to the first guide plate 930, a first linear motor 933 moving along one of the first guide shaft 931, a first guide block 932 coupled to the other one of the first guide shaft 931 and moving together with the first linear motor 933, a first pusher 936 connected to the first guide block 932 and pushing and moving the fourth carrier block 830, and a first sensor rod 935 detecting the fourth carrier block 830 moving along the sixth chain belt 810 at a position corresponding to the first guide plate 930.

In the first pusher means, the steering wheel 10 accommodated on the fourth carrier block 830 is cleaned by the supersonic wave while passing the cleaning liquid 850. On arriving at the rear end of the sixth chain belt 810, the fourth carrier block 830 is detected by the first sensor rod 935 and the first sensor block 934. A detection signal stops a driving motor (not shown) for driving the sixth chain belt 810. Simultaneously, the detection signal drives the first linear motor 933 to move the first pusher 936. The moving pusher 936 pushes the fourth carrier block 830 in one direction to take it out of the first block case 840 and continuously moves the fourth carrier block 830 to slide on the first guide plate 930 so as to be inserted in the second block case 920.

The fourth carrier block 830 inserted in the second block case 920 is moved by the operation of the seventh chain belt 910 to the second cleaning unit 900 to be described later.

Second Cleaning Unit 900

The second cleaning unit 900 finally cleans the steering wheel 10 cleaned by the supersonic wave in the first cleaning unit 800 using cleaning water.

Figure 40:
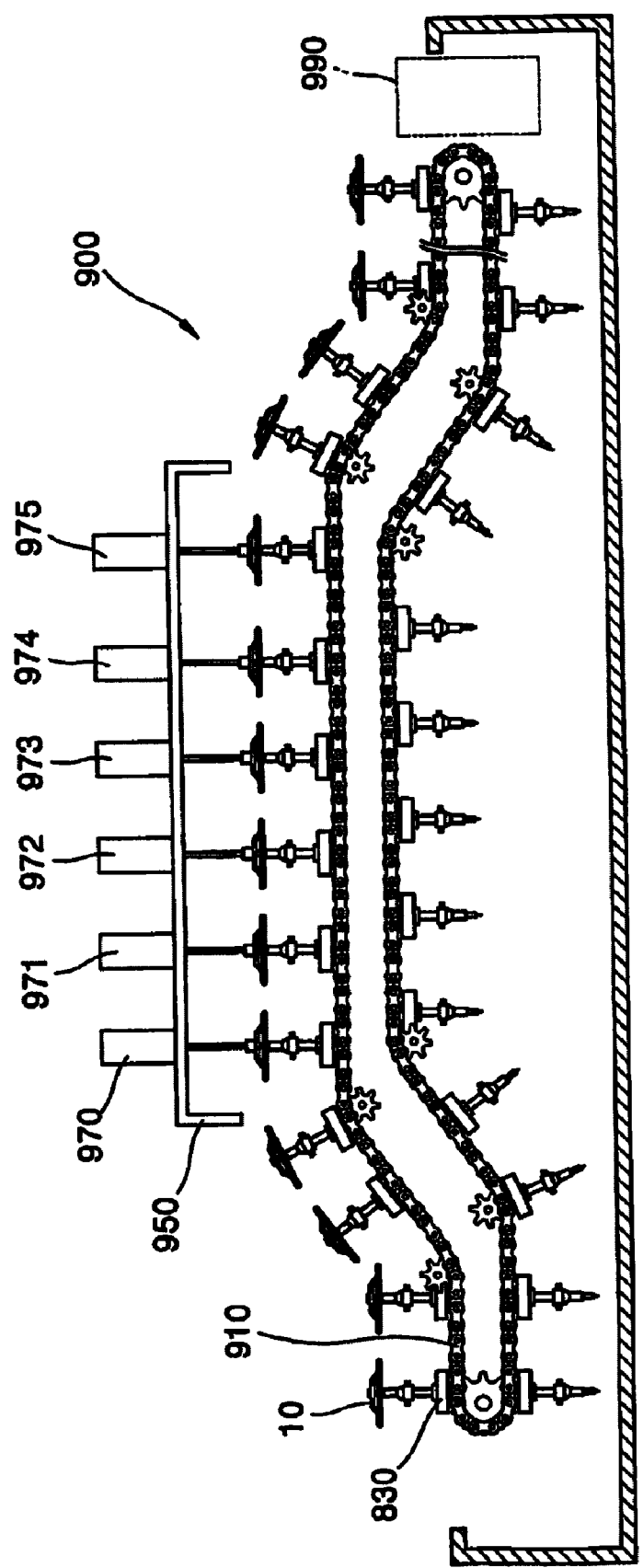
FIG. 40 is a perspective view illustrating a second cleaning unit.
Figure 41:
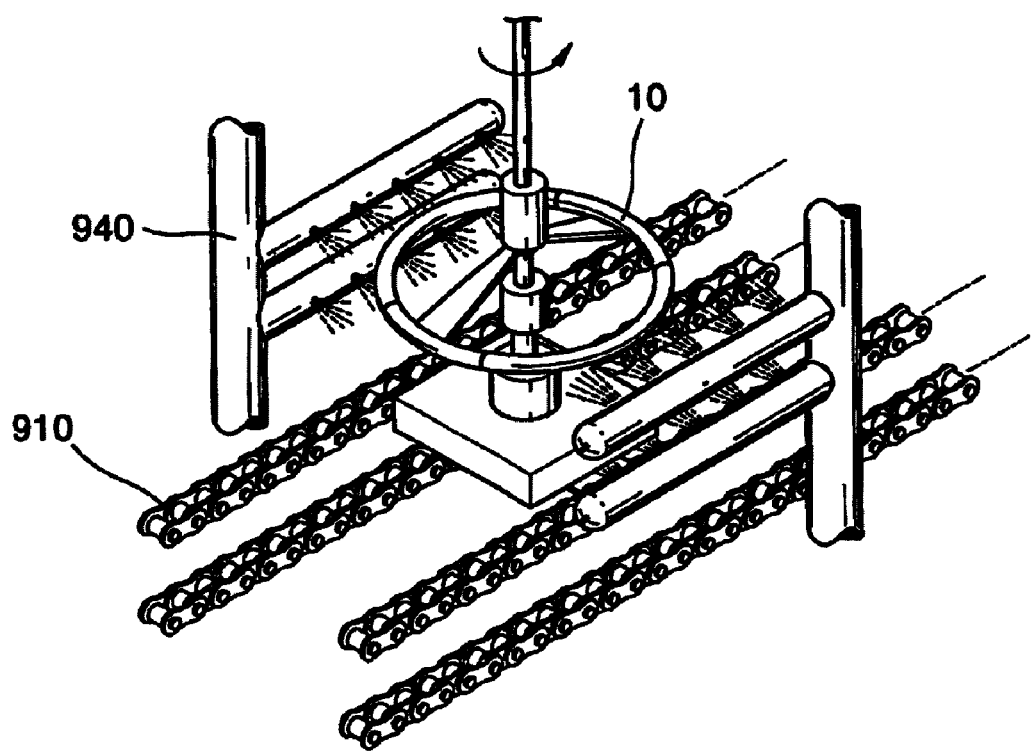
FIG. 41 is a perspective view illustrating a state of cleaning the wheel by the second cleaning unit.

Referring to FIGS. 40 and 41, the second cleaning unit 900 includes the fourth carrier block 830 where the first cleaned steering wheel 10 is accommodated and the seventh chain belt 910 moving the fourth carrier block 830.

A chamber 950 forming a cleaning space is provided in a particular section of the seventh chain belt 910. An injection pipe 940 injecting cleaning water onto the surface of the steering wheel 10 is provided inside the chamber 950. A wheel rotating means to clean the steering wheel 10 by rotating the same is also provided in the chamber 950. The injection pipe 940 is provided at the left and right sides of upper and lower portions of the steering wheel 10 (the injection pipes in the upper and lower portions are omitted in FIG. 41), to clean the steering wheel 10.

Figure 42:
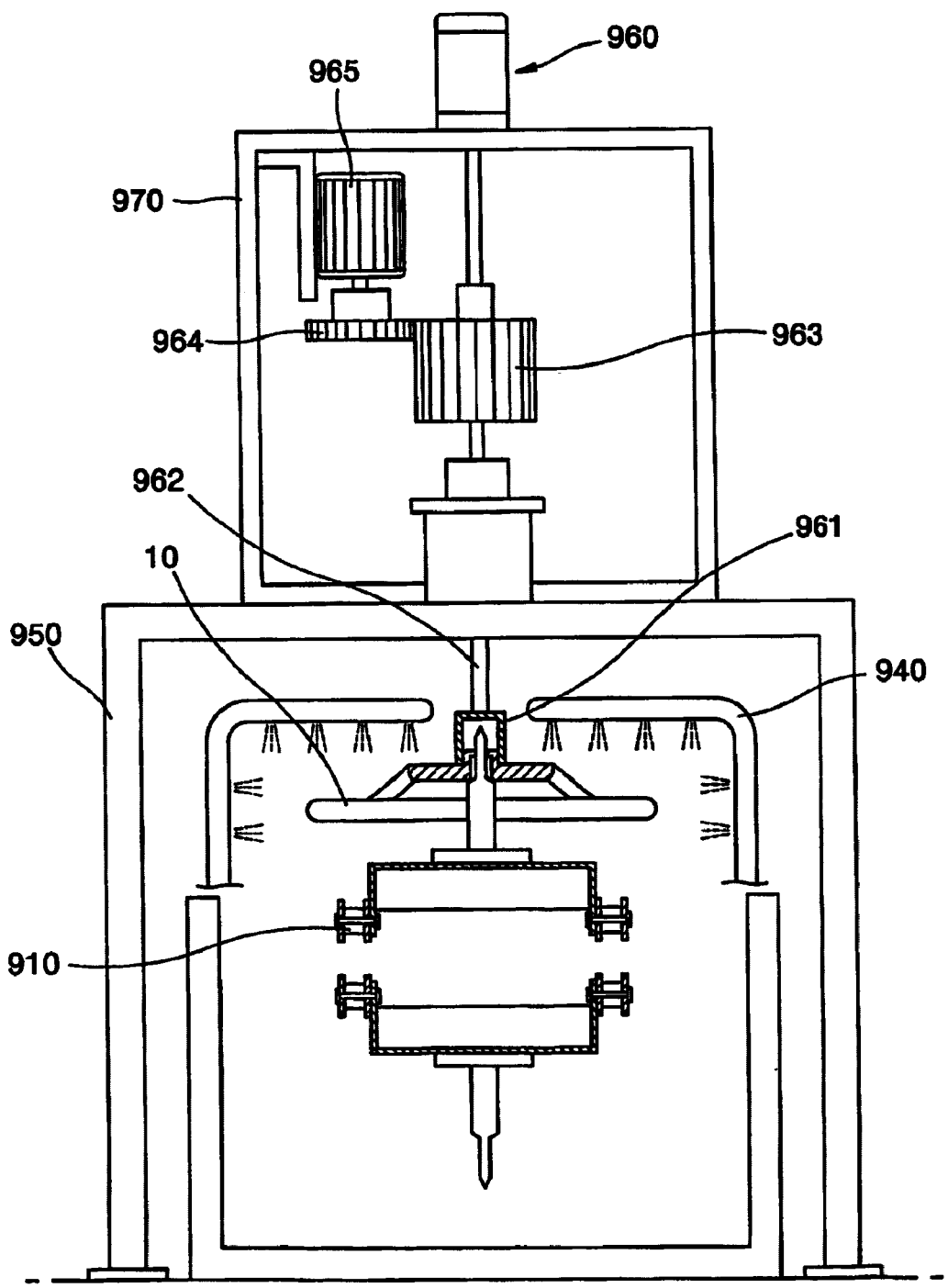
FIG. 42 is a perspective view illustrating a state in which the wheel is rotated while being cleaned by the second cleaning unit.

The structure of the wheel rotating means is similar to that of the rotating means of the foreign material removing unit 400 which rotates the steering wheel 10. That is, referring to FIG. 42, the wheel rotating means includes a second main cylinder 960 having a second cylinder rod 962 where a second coupling chuck 961 coupled to the boss 11 of the steering wheel 10 is formed at an end portion thereof, a second elevating gear 963 coaxially coupled to the second cylinder rod 962 and moving up and down together with the second cylinder rod 962, and a fourth driving motor 965 having a second motor gear 964 rotated by being engaged with the second elevating gear 963.

These constituent elements of the rotating means are supported by a frame 970 fixed on the upper surface of the chamber 950.

A plurality of the rotating means rotating the steering wheel 10 are arranged at a predetermined interval, as shown in FIG. 40. That is, the same constituent elements as those supported by the frame 970 are supported by the respective frames 971 through 975.

In this case, the type and strength of the cleaning water can be differently set according to the position of rotation. Also, water can be removed by an air blower (not shown) at a different position of rotation.

The cleaned steering wheel 10 is moved by a worker from the position C so that a different work can be performed.

Circulation of Fourth Carrier Block 830

Figure 43:
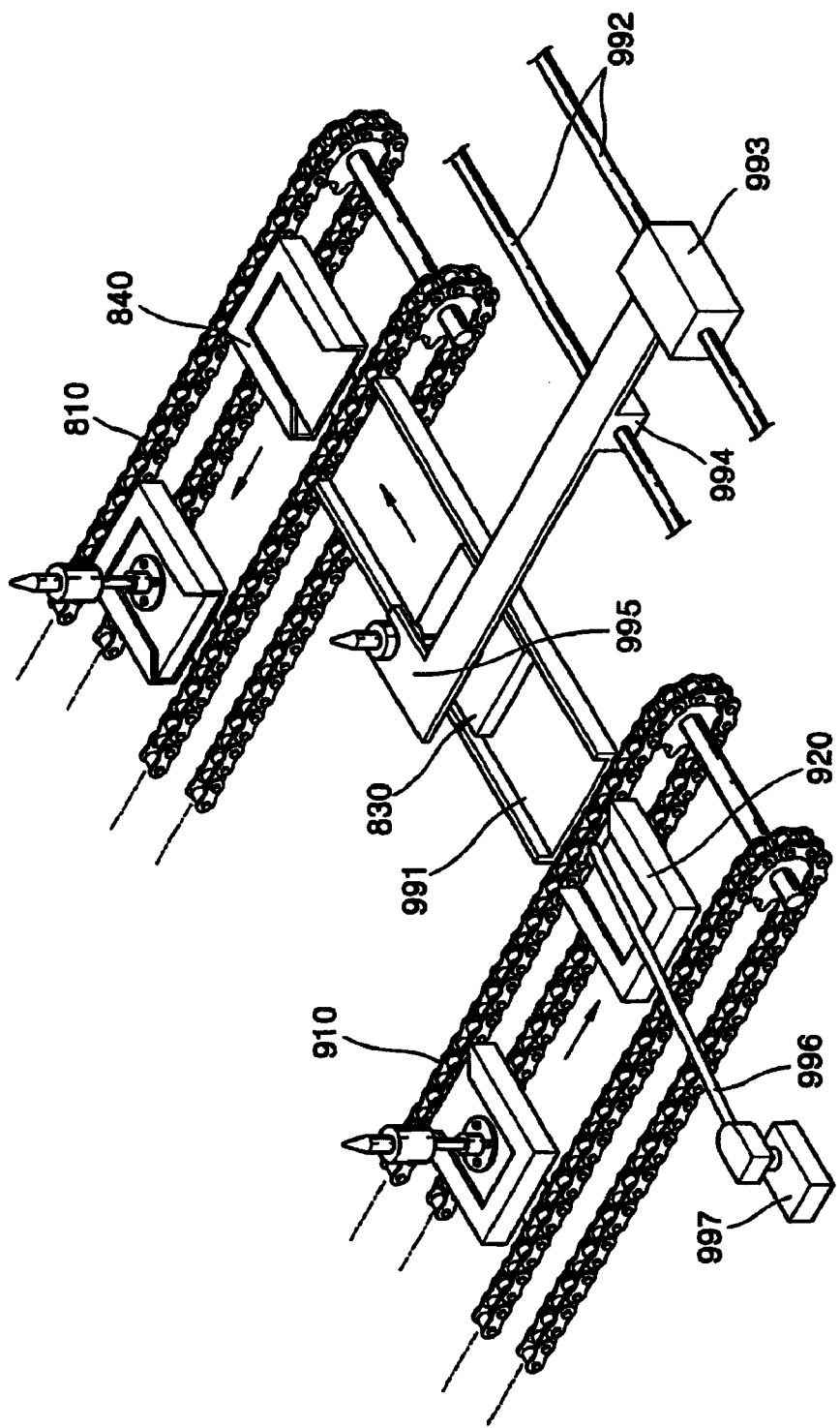
FIG. 43 is a perspective view illustrating a state in which the fourth transfer block is back to the first block case.

The fourth carrier block 830 from which the cleaned steering wheel 10 is removed by a worker is supplied again to the first block case 840 coupled to the sixth chain belt 810 from the second block case 920 by the carrier block circulation means 990 (refer to FIGS. 7 and 43).

The carrier block circulation means has a similar structure to that of the moving means which moving the fourth carrier block 830 passing the first cleaning unit 800 to the second cleaning unit 900.

The circulation means has a second guide plate 991, provided between the sixth chain belt 810 and the seventh chain belt 910, for guiding the fourth carrier block 840 to slide in the first block case 840 from the second block case 920.

The second pusher means includes a pair of second guide shafts 992 parallel to the second guide plate 991, a second linear motor 993 moving along one of the second guide shafts 992, a second guide block 994 coupled to the other one of the second guide shafts 992 and moving together with the second linear motor 993, a second pusher 995 coupled to the second guide bock 994 and pushing the fourth carrier block 830 to move together, and a second sensor rod 996 detecting the fourth carrier block 830 moving along the seventh chain belt 910 at a position corresponding to the second guide plate 991.

The second pusher means is detected by the second sensor rod 996 and the second sensor block 997 when the fourth carrier block 830 removed of the steering wheel 10 arrives at the rear end of the seventh chain belt 910. The detection signal stops a driving motor (not shown) driving the seventh chain belt 910. Simultaneously, the detection signal drives the second linear motor 993 to moved the second pusher 995 the moved second pusher 995 pushes the fourth carrier block 830 in one direction to take the fourth carrier block 830 out of the second block case 920. The second pusher 995 continuously make the fourth carrier block 830 slide on the second guide plate 991 to be inserted in the first block case 840.

The fourth carrier block 830 circulates along the second flipping unit 700, the first cleaning unit 800, and the second cleaning unit 900.

It is of course that the present invention is limited to the above-described preferred embodiment and a variety of modifications are possible.

As described above, in the present invention, since a series of hydraulic pressure transfer processes, such as steering wheel supply, first transfer to the front surface portion of a rim of a steering wheel, removing of foreign materials, drying, second transfer to the rear surface portion of a rim of a steering wheel, first cleaning, and second cleaning, are automated, the processing time is saved and costs for manpower is reduced, thus improving productivity.

Also, since hydraulic pressure transfer is performed by the first and second robot units holding a steering wheel, transfer is performed accurately and production of steering wheels having the same high transfer quality is possible. Thus, it is possible to provide improved product reliability to customers.

Furthermore, since transfer to the rim portion of the steering wheel is performed by the first and second steps, an extension of a pattern is minimized while increasing clarity of the pattern, thus improving the quality of products.

What is claimed is:

1. A method for automatically transferring a pattern to a surface of a steering wheel, the method comprising:
   supplying a steering wheel having a boss and a rim such that the boss is disposed upward and a rim portion is disposed downward;
   supplying a first transfer sheet having a printed layer on which a pattern is printed, by floating the first transfer sheet on a liquid;
   injecting an activating liquid to activate the printed layer onto an upper surface of the first transfer sheet;
   transferring the first transfer sheet to a surface of a first half of the rim by pressing the rim against the upper surface of the first transfer sheet while a robot holds the boss of the steering wheel;
   removing foreign material remaining around the rim after transferring the first transfer sheet;
   drying the steering wheel where the foreign material has been removed by passing the steering wheel through a drying tank in which hot air is supplied;
   flipping the steering wheel a first time such that the rim of the steering wheel is disposed upward and the boss is disposed downward;
   supplying a second transfer sheet having a printed layer on which a pattern is printed, by floating the second transfer sheet on the liquid;
   transferring the second transfer sheet to a surface of a second half of the rim by pressing the rim against the upper surface of the second transfer sheet while holding the steering wheel;
   after transferring the second sheet, cleaning the steering wheel a first time in an ultrasonic wave cleaning tank; and
   after cleaning the first time, cleaning the steering wheel a second time using cleaning water.

2. The method of claim 1, wherein, in removing foreign material, removing foreign material using air hoses which suck the foreign material from the rim by rotating the steering wheel.

3. The method of claim 1, further comprising, after transferring the second transfer sheets, flipping the steering wheel a second time such that the boss is disposed upward and the rim is disposed downward.

4. An apparatus for automatically transferring a transfer sheet to a surface of a rim of a steering wheel having a boss for coupling to a steering shaft and connected to the rim by a plurality of spokes, the apparatus comprising:
   a steering wheel supply unit supplying a steering wheel such that the boss is disposed upward and the rim portion is disposed downward;
   a first transfer sheet supply unit supplying a first transfer sheet having a printed layer on which a pattern is printed, by floating the first transfer sheet on a first liquid;
   a first robot unit holding the boss of the steering wheel and pressing the rim against an upper surface of the first transfer sheet to transfer the first transfer sheet to a first half of the rim;
   a foreign material removing unit removing foreign material remaining around the rim by moving the steering wheel where the first transfer sheet is transferred by the first robot unit;
   a drying unit drying the steering wheel where the foreign material has been removed, by supplying hot air;
   a first flipping unit flipping the steering wheel such that the rim of the steering wheel, after drying, is disposed upward and the boss is disposed downward;
   a second transfer sheet supply unit supplying a second transfer sheet having a printed layer on which a pattern is printed, by floating the second transfer sheet on a second liquid;
   a second robot unit holding the steering wheel after flipping and pressing the rim against an upper surface of the second transfer sheet to transfer the second transfer sheet to a second half of the rim;
   a first cleaning unit cleaning the steering wheel where the second transfer sheet has been transferred; and
   a second cleaning unit cleaning the steering wheel, using cleaning water.

5. The apparatus of claim 4, wherein the steering wheel supply unit comprises:
   a pair of chain belts separated from each other and circulating together;
   a driving motor driving the pair of chain belts; and
   a carrier block, where the steering wheel is accommodated, fixed between the pair of chain belts and moving together with the pair of chain belts.

6. The apparatus of claim 5, further comprising:
   a sensor member detecting movement of the steering wheel accommodated on the carrier block; and
   a stop portion stopping the first carrier block according to a detection signal of the sensor member.

7. The apparatus of claim 5, wherein the first carrier block comprises:
   a lower plate fixed between the pair of chain belts;
   a guide shaft fixedly coupled to the lower plate;
   an upper plate including a sleeve is located at a bottom surface of the upper plate so that the guide shaft is coupled to the sleeve for sliding;
   a spring coupled to the guide shaft for elastically moving the upper plate with respect to the lower plate; and
   a post fixed to the upper surface of the upper plate and having a head block to which the boss of the steering wheel may be coupled and accommodated.

8. The apparatus of claim 6, wherein the stop portion comprises:
   a stopper extending downward from a side surface of the carrier block; and
   a stopper cylinder located between the pair of chain belts and having a sliding rod sliding in and out to interfere with the stopper.

9. The apparatus of claim 7, further comprising an elevating cylinder accommodating and raising the steering wheel from the head block at a stop position of the carrier block.

10. The apparatus of claim 4, wherein the first transfer sheet supply unit comprises:
    a tank for containing the first liquid;
    a pair of chain belts separated from each other and circulating together in the tank;

a driving motor driving the chain belts; and a plurality of connection rods, located at a predetermined interval, having respective ends fixed to the second chain belts and moving on a surface of the first liquid, wherein the first transfer sheet is moved together with the connection rods between neighboring connection rods on the surface of the first liquid.

11. The apparatus of claim 10, including a discharge hole through which the first liquid exceeding a particular surface level is discharged to maintain a constant surface level of the first liquid in the tank.

12. The apparatus of claim 4, wherein the first robot unit comprises:

a main arm pivoting with respect to a base;

a first arm coupled to the main arm by a hinge and pivoting up and down;

a second arm connected to the first arm and pivoting; and a third arm connected to the second arm and pivoting, and having a chuck member holding the boss of the steering wheel at an end of the third arm.

13. The apparatus of claim 12, further comprising an injection nozzle, located at the end of the third arm, injecting an activating liquid onto the first transfer sheet.

14. The apparatus of claim 13, wherein the foreign material removing unit comprises:

a carrier block having a post where the steering wheel to which the first transfer sheet has been transferred is accommodated;

a rotation portion rotating the steering wheel where the carrier block is accommodated; and an air hose sucking foreign material remaining on the steering wheel and located proximate the steering wheel being rotated by the rotation portion.

15. The apparatus of claim 14, wherein the rotation portion comprises:

at main cylinder having a cylinder rod having a coupling chuck coupled to the boss of the steering wheel, located at an end of the cylinder rod, and rotating the steering wheel;

an elevating gear coaxially coupled to the cylinder and moving up and down together with the cylinder rod; and a driving motor having a motor gear engaged with the elevating gear and rotating together with the elevating gear.

16. The apparatus of claim 4, wherein the first flipping unit comprises:

first and second holding cylinders having a pair of grips holding opposite parts of the steering wheel;

a frame supporting the first and second holding cylinders for rotation;

a rotation cylinder supported by the frame and rotating the first and second holding cylinders;

an elevating cylinder elevating the frame; and a horizontal moving cylinder horizontally moving the second elevating cylinder and the frame.

17. The apparatus of claim 16, further comprising an arm member having ends supported by the frame for rotating together with the first and second cylinders.

18. The apparatus of claim 17, including a stopper restricting degree of rotation of the arm member located at the frame.

19. The apparatus of claim 16, including a moving unit on which the steering wheel is accommodated after flipping and movement, located between the first flipping unit and the second transfer sheet supply unit.

20. The apparatus of claim 19, wherein the moving unit comprises:

a plurality of carrier blocks, each block having a head block to which the boss of the steering wheel, after flipping, is coupled; and chain belt to which the carrier blocks are fixed at a predetermined interval, and circulating along an endless path.

21. The apparatus of claim 4, wherein the second transfer sheet supply unit comprises:

a tank for containing the second liquid;

a pair of chain belts separated a predetermined distance and circulating together in the tank;

a driving motor driving the pair of chain belts; and a plurality of connection rods, located at a predetermined interval, having ends fixed to the pair of chain belts and proceeding on a surface of the second liquid, wherein the second transfer sheet is moved together with the connection rods between neighboring connection rods on the surface of the second liquid.

22. The apparatus of claim 21, including a discharge hole through which the second liquid exceeding a particular surface level is discharged to maintain a constant surface level of the second liquid in the tank.

23. The apparatus of claim 4, wherein the second robot unit includes multi-joints for moving and inclining up and down, and left and right, by holding the steering wheel at an end of the second robot unit, and comprises:

a fixed bar fixed to the last joint of the multi-joints;

first and second holding levers rotatably supported by ends of the fixed bar and holding the steering wheel; and first and second operating cylinders rotating the first and second holding levers.

24. The apparatus of claim 23, wherein the second robot unit further comprises an injection nozzle injecting an activating liquid onto the second transfer sheet.

25. The apparatus of claim 4, wherein the first cleaning unit comprises:

a tank for containing a third liquid;

a first chain belt circulating along an endless path in the tank;

a plurality of carrier blocks supporting the steering wheel and moving together by being connected to the first chain belt at a predetermined interval; and an ultrasonic oscillator accommodated in the tank and generating ultrasonic waves.

26. The apparatus of claim 25, further comprising a moving unit moving the carrier block passing through the first cleaning unit to the second cleaning unit.

27. The apparatus of claim 26, wherein the second cleaning unit comprises:

a second chain belt driven parallel to the first chain belt;

a plurality of first and second block cases fixed to the first and second chain belts at a predetermined interval, the fourth carrier blocks being detachably accommodated;

a guide plate located between the first and second chain belts and guiding the carrier blocks for sliding; and a pusher portion taking the carrier block from the first block case and coupling the carrier block to the second block case via the guide plate.

28. The apparatus of claim 27, wherein the pusher portion comprises:

a pair of guide shafts parallel to the guide plate;

a linear motor moving along one of the guide shafts;

a guide block coupled to another one of the guide shafts and moving together with the linear motor;

a pusher connected to the guide block and pushing the carrier block so the guide block and the carrier block are moved together; and a sensor block having a sensor rod detecting the carrier block moving along the first chain belt at a position corresponding to the guide plate, and driving the linear motor by transmitting a detection signal to the linear motor.

29. The apparatus of claim 4, wherein the second cleaning unit comprises:

a carrier block where the steering wheel is accommodated after cleaning by the first cleaning unit;

a chain belt moving the carrier block;

an injection pipe injecting cleaning water onto a surface of the steering wheel; and a wheel rotating unit rotating the steering wheel.

30. The apparatus of claim 29, wherein the wheel rotating unit comprises:

a main cylinder having a cylinder rod with a coupling chuck coupled to the boss of the steering wheel, located at an end of the cylinder rod, and rotating the steering wheel;

an elevating gear coaxially coupled to the cylinder rod and moving up and down together with the cylinder rod; and a driving motor having a motor gear engaged with the second elevating gear and rotating together with the elevating gear.

31. The apparatus of claim 29, further comprising a carrier block circulation unit moving the carrier block passing the second cleaning unit.

32. The apparatus of claim 31, wherein the carrier block circulation unit comprises:

a guide plate located between a pair of chain belts and guiding the carrier block for sliding; and a pusher unit taking the coupling the carrier block via the guide plate.

33. The apparatus of claim 32, wherein the pusher unit comprises:

a pair of guide shafts parallel to the guide plate;

a linear motor moving along one of the guide shafts;

a guide block coupled to another guide shaft and moving together with the linear motor;

a pusher connected to the guide block, pushing the carrier block and moving together with the carrier block; and a sensor block having a sensor rod detecting the carrier block moving along the chain belt at a position corresponding to the guide plate, and driving the linear motor by transmitting a signal detected to the linear motor.

34. The apparatus of claim 4, further comprising a second flipping unit flipping the steering wheel such that the rim of the steering wheel to which the second transfer sheet has been transferred is disposed downward and the boss of the steering wheel is disposed upward.

35. The apparatus of claim 34, wherein the second flipping unit comprises:

first and second holding cylinders having a pair of grips holding opposite parts of the steering wheel;

a frame supporting the first and second holding cylinders for rotating;

a rotation cylinder supported by the frame and rotating the first and second holding cylinders;

an elevating cylinder elevating the frame; and a fixed support frame where the elevating cylinder is fixedly supported.

36. The apparatus of claim 35, including a guide rail in a vertical direction fixed to the frame, and a guide block coupled to the guide rail for sliding and coupled to the rotation cylinder.

37. The apparatus of claim 35, including an arm member rotating together with the first and second holding cylinders and located at the frame so that, when the steering wheel is flipped, the arm member is rotated.

* * * * *